United States Patent [19]
Ikedo et al.

[11] Patent Number: 4,809,252
[45] Date of Patent: Feb. 28, 1989

[54] MULTI-DISK PLAYER SYSTEM

[75] Inventors: Yuji Ikedo; Tsutomu Miyakawa; Takahiro Okajima; Masahiko Miyake, all of Saitama, Japan

[73] Assignee: Pioneer Electronic Corporation, Tokyo, Japan

[21] Appl. No.: 914,219

[22] Filed: Oct. 2, 1986

[30] Foreign Application Priority Data

Oct. 2, 1985 [JP] Japan ............... 60-151041

[51] Int. Cl.$^4$ .................. G11B 17/28; G11B 5/48
[52] U.S. Cl. ................................ 369/34; 369/36; 369/39
[58] Field of Search ............... 369/36, 38, 39, 34

[56] References Cited

U.S. PATENT DOCUMENTS

| | | | |
|---|---|---|---|
| 2,565,881 | 8/1951 | Peters | 369/36 |
| 4,682,313 | 7/1987 | Miyake | 369/39 |
| 4,730,291 | 3/1988 | Ikedo et al. | 369/39 |
| 4,730,292 | 3/1988 | Hasegawa et al. | 369/39 |

FOREIGN PATENT DOCUMENTS

| | | |
|---|---|---|
| 139327 | 5/1985 | European Pat. Off. . |
| 173136 | 7/1985 | European Pat. Off. . |
| 2531799 | 2/1984 | France . |
| 2578676 | 9/1986 | France . |
| 60-173762 | 9/1985 | Japan . |
| 60-170061 | 9/1985 | Japan . |
| 2139800 | 11/1984 | United Kingdom . |
| 2160349 | 12/1985 | United Kingdom . |

OTHER PUBLICATIONS

"Now, the Compact Disc Jukebox", Advertising Brochure from Pioneer.

Primary Examiner—Steven L. Stephan
Attorney, Agent, or Firm—Sughrue, Mion, Zinn, Macpeak & Seas

[57] ABSTRACT

Disclosed is a disk holder adapted to be inserted and fitted into a loading means of a disk player. The disk holder supplys a disk to the disk player in response to the operation of the player. The disk holder includes a housing for holding a plurality of disks, a plurality of plate-shape trays each loading each of the disks on each principal face thereof. Each of the trays is provided ejectable from the retractable in the housing along the principal face. The disk holder further includes flexible members positioned confronting with each of the disk loading face and projecting from the principal face of neighboring tray.

11 Claims, 21 Drawing Sheets

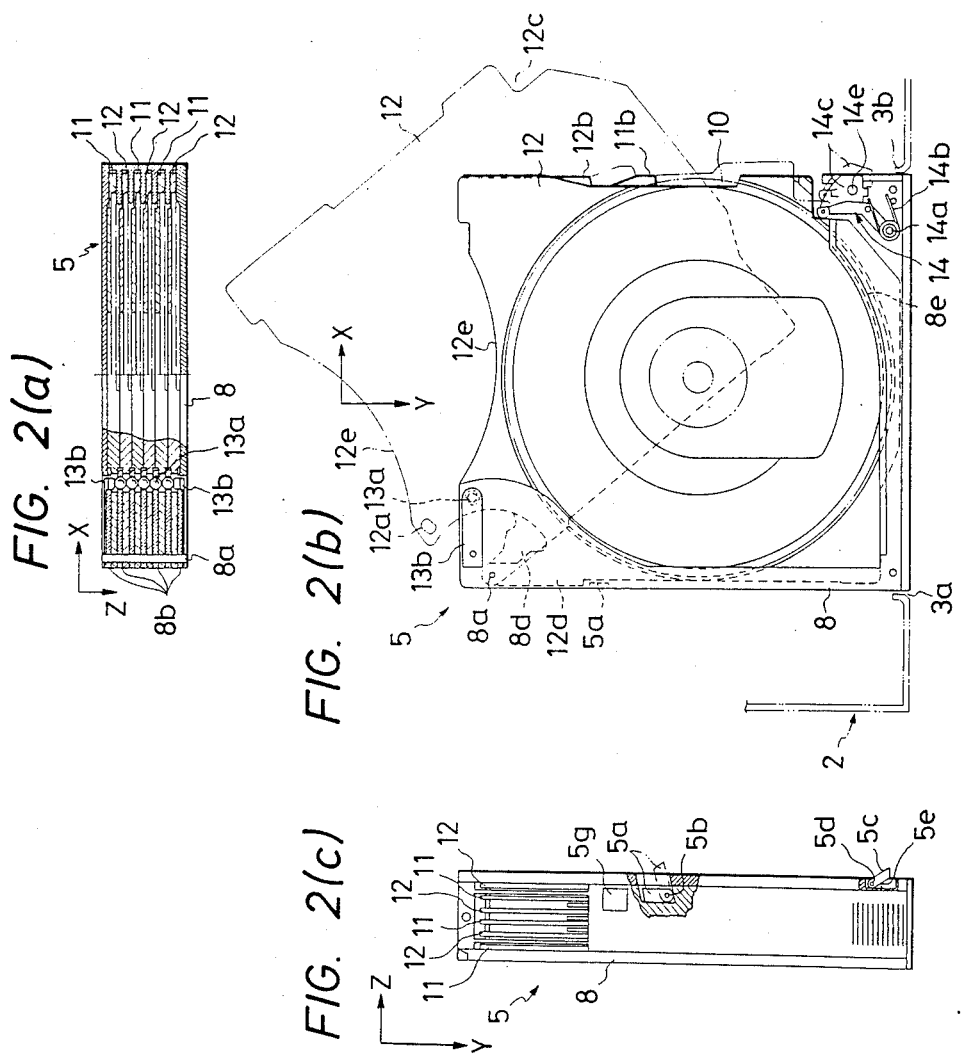

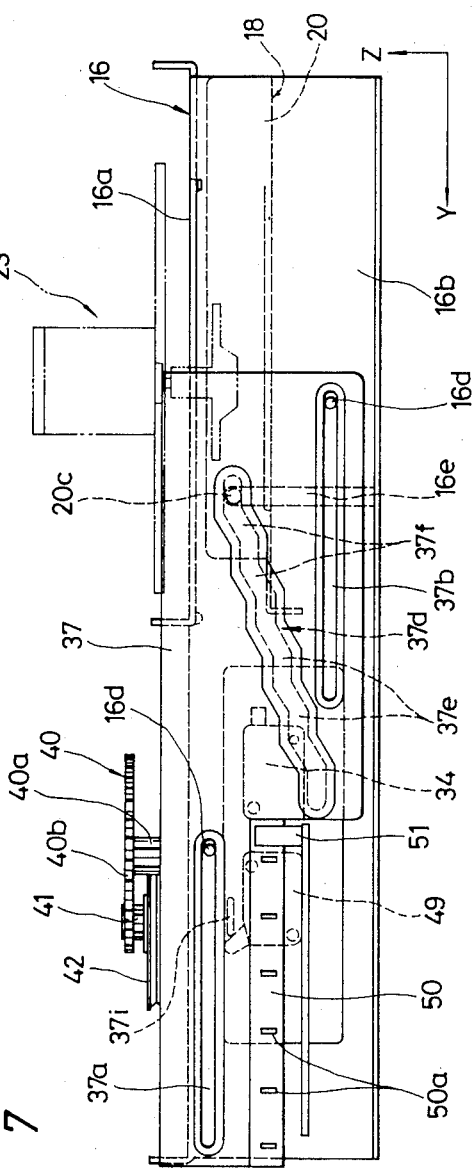

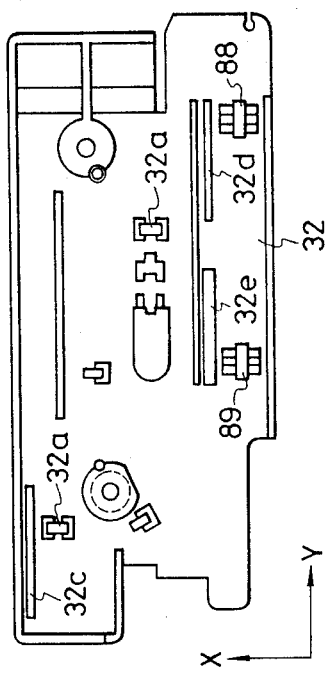
FIG. 15(a)
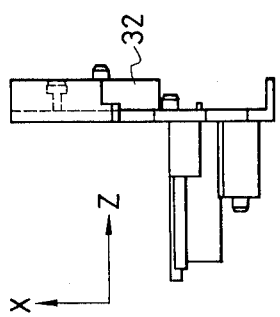
FIG. 15(b)
FIG. 15(c)

MULTI-DISK PLAYER SYSTEM

BACKGROUND OF THE INVENTION

The present invention relates to a multi-disk player system, and more particularly to a multi-disk player capable of containing a plurality of disks and successively selecting any one of the disks and continuously playing them back. This invention also particularly relates to a disk holder for holding disks and for being incorporated in a multidisk player body in such a manner that it can be installed and removed therefrom. There is known a Jukebox as a multi-disk player system that is capable of accommodating a plurality of disks and which enables continous playing of music on a series of randomly selected disks. The jukebox may be regarded as a common type of multi-disk player, but the conventional jukebox is contained within a very large cabinet and is not suitable for use at home.

With the recent advance in digital recording technology, several types of digital audio disks (hereinafter abbreviated as DAD) have been developed and are in extensive use. Compared with the conventional analog audio disks, DADs feature an increased information capacity and a reduced noise problem during reproduction. Small-sized DADs (o.d. of about 12 cm) are commonly referred to as compact disks which are adapted to have signals written and read thereon by a laser beam; compact disks are simple to use and enable reduction in the overall size of the disk player. Making use of these features of small-sized DADs, audio makers have recently developed a multi-disk player which is ideal as a home jukebox and which is capable of continuous playing of a plurality of (typically 5 or 6) compact disks. It is worth nothing that a single compact disk can play approximately one hour, which is equivalent to about 1.5 times the information capacity of the conventional analog audio disk. This means that 6 compact disks have a capacity of about 120 pieces of music assuming that each piece continues for a period of 3 minutes on average, and as a result, the listener can make his own music library containing favorite pieces in magazines classified by genre such as jazz, chanson or classics.

A multidisk player basically comprises a playback means including a turntable and a pickup, a disk holder for holding disks and for being inserted and fitted in a loading means within a player housing, and a disk-unloading/conveying mechanism for conveying a disk loaded on the disk holder to a playback position, i.e., onto the turntable.

When a disk is conveyed onto the turntable in the disk holder in such a multidisk player, the disk is normally moved in two directions parallel and roughly perpendicular to the disk-holding face of the turntable. In the multidisk player already developed, however, the above disk-unloading/conveying mechanism for the disk conveyance is so operated as to directly hold the disk end at the disk-ejecting side or hold the whole body thereof and eject it from the disk holder. Since the disk-unloading/conveying mechanism, to say nothing of the disk-holding mechanism, is not only complicated but also large in size and further requires a large space for operation, it has been difficult to make compact the player as a whole and to prevent the increasing cost.

In a multidisk player newly developed to solve the above problems, as disclosed by Japanese Patent Application No. 104303/85 (not prior art within a meaning of 35 USC 102), the disk holder includes a housing and a plurality of plate-shaped trays, each being capable of holding the disk on its principal face and of being ejected from or retracted in the housing along the principal face. In other words, by simply ejecting each plate-like tray loaded with the disk from the housing, the disk is conveyed in one direction (parallel to the disk-holding face of the turntable). Accordingly, this multidisk player is simpler in construction than what is equipped with the disk-unloading/conveying mechanism for directly ejecting the disk out of the disk holder by holding the end of the disk in the disk-ejecting direction or the whole body thereof with the complicated mechanism so that the former can readily be made compact and less costly.

In the disk holder thus constructed, however, it is to be appreciated that part of a tray being ejected may touch the surface of the disk loaded on the adjacent tray and the disk will be damaged when the tray loaded with the desired disk for being replayed is ejected out of the housing.

Further, according to the multidisk player under development, when pieces of music in a particular field such as jazz are played back using a multidisk player developed so far, the disk holder loaded with disks storing pieces in other fields is replaced with another loaded with disks storing pieces in the desired field or otherwise any one of the disks contained in the disk holder pulled out of the player housing is replaced with another storing pieces in the desired field and then the disk holder is again loaded to the loading means in the player housing. Moreover, if a plurality of disks are required, the above described disk replacement operations must be carried out with respect to each of the desired disks.

Therefore, a disk replacement operation would be troublesome for the audience, and high operability is needed.

The disk-unloading/conveying mechanism for bidirectionally conveying the disk includes a tray-ejecting means for ejecting the tray loaded with the disk to be played back from the housing of the disk holder and a disk shift means for shifting the disk loaded on the tray thus ejected from the housing in the direction roughly perpendicular to the disk-holding face of the turntable. The tray-ejecting means has a support member extending along the direction in which the trays are arranged, a moving member installed on the support member movably in the direction of the arrangement of the trays and loaded with the playback means (the turntable and the pickup), tray-ejecting member installed on the moving member in a fixed direction and used to eject the tray from the housing of the disk holder by successively mating with each tray, a tray-ejecting member shift means for shifting the tray-ejecting member, together with the moving member, to the position where the tray loaded with the disk to be played back mates therewith, and a tray-ejecting member driving means for driving the tray-ejecting member to be ejected from the housing.

In other words, by shifting the playback means as a whole including the turntable and the pickup, together with the moving member loaded with the playback means, along the direction in which trays are arranged, each tray is shifted relative to the turntable in the direction of the arrangement of the trays. Moreover, by driving and shifting the tray ejecting member, each tray is pushed out of the housing of the disk holder to position the disk on the tray right under the turntable. Copending U.S. application, commonly assigned, has been filed with Ser. No. 837,121, filed on Mar. 7, 1986.

SUMMARY OF THE INVENTION

The present invention is intended to solve the above problems and it is therefore an object of the invention to provide a disk holder free from damage when a disk is taken in and out.

It is another object of the present invention to provide a disk holder capable of offering excellent operability concerning the loading and replacement of disks for a multidisk player.

It is another object of the present invention to provide a disk holder capable of offering excellent operability concerning the loading and replacement of disks for a multidisk player.

Still another object of the present invention is to provide a multidisk player capable of being readily made compact and conveying disks with accuracy.

Still another object of the present invention is to provide a multidisk player capable of offering excellent operability related to disk loading.

The disk holder according to the present invention comprises a housing, a plurality of plate-shaped trays, each capable of loading a disk on the principal face thereof, of being ejected from and retracted in the housing along the principal face thereof, and a flexible member projecting from the principal face and installed in a fixed position on the principal face of the adjoining tray arranged opposite to the disk holding face of each tray.

The disk holder according to the present invention is capable of holding disks which holder is not only replaceable but also detachable and attachable from and to a loading means in a multidisk player, the disk holder comprising a first member for being directly loaded to the loading means, a second member movable relative to the first member within a fixed range along the direction wherein the first member is loaded to the loading means, the second member being loaded with one disk, a means for providing the second member with moving force and a lock means for locking the second member to the first member, characterized in that the lock means includes a lever member for releasing the locked state and, when loaded to the loading means, the lever member mates with a predetermined mating means provided in the loading means to release the locked state caused by the lock means.

The lever means is set back from the surface of the housing of the disk holder and equipped with a manual release button for releasing the locked state caused by the lock means.

The first member comprises a bottom plate and a top plate so positioned and coupled to the bottom plate; the second member is provided with a circular disk-holding face whose diameter is slightly larger than that of the disk; the top plate is supplied with a semicircular cut out whose radius of curvature is slightly larger than the radius of the disk, the semicircular cut out being provided at one end opposite to the direction wherein the second member is loaded to the loading means; and the arcuate portions of said circular disk-holding face and the semicircular cut out conform to each other while the second member to be ejected from the loading means moves relative to the first member.

The multidisk player according to the present invention including a player housing, playback means provided in the player housing, a disk holder for holding disks and for being inserted and loaded to the player housing and a disk-unloading/conveying mechanism for conveying the disk contained in the disk holder to a playback position; the disk holder having a housing and a plurality of plate-shaped trays, each being capable of holding a disk on the principal face thereof and being ejected from and contained in the housing along the principal face; the disk-unloading/conveying mechanism having a support member extending along the direction wherein the trays are arranged, a moving member installed on the support member movably in the direction of said arrangement of trays and loaded with said playback means, a tray-ejecting member installed on the moving member rotatably on a rotary shaft extending in the direction of the arrangement thereof and employed to eject the tray from the housing by successively mating with the end of each rotating tray, shifting means for shifting the tray-ejecting member together with the moving member to the position where the tray loaded with the disk to be played back mates therewith, torque generator means for driving the tray-ejecting means to allow the tray to eject from the housing and torque transmission means, the torque generator means and the torque transmission means being provided on the support member.

The multidisk player according to the present invention comprises a lock mechanism for locking a disk holder for holding disks and for being inserted and loaded into a loading means of a player housing to the player housing in the loading position and a tray-ejecting member driving means for driving the tray-ejecting member for ejecting the tray loaded with the disk to be played back from the housing of the disk holder. The tray-ejecting member driving means is equipped with a moving body installed movably in a fixed direction and used to drive the tray-ejecting member and a means for providing the moving body with driving force. The lock mechanism is provided with a lock member installed in such a manner as to reciprocate between a first position where the disk holder is locked and a second position where the locked state is released and lock the disk holder by partially mating with the disk holder, and an energizing means for so energizing the lock member as to make the lock member mate with the disk holder. When the lock member is located close to the second position, the lock member mates with the moving body to regulate the movement of the moving body.

BRIEF DESCRIPTION OF THE DRAWINGS

In the drawings:

FIGS. 2(a) through 5(b) are diagrams illustrating a magazine.

FIGS. 7 through 9 are arrow diagrams taken on line VII—VII concerning FIG. 6.

FIGS. 11(a) through 23 are partial detailed veiw of internal construction.

DETAILED DESCRIPTION OF THE PREFERRED EMBODIMENTS

Figure 1:
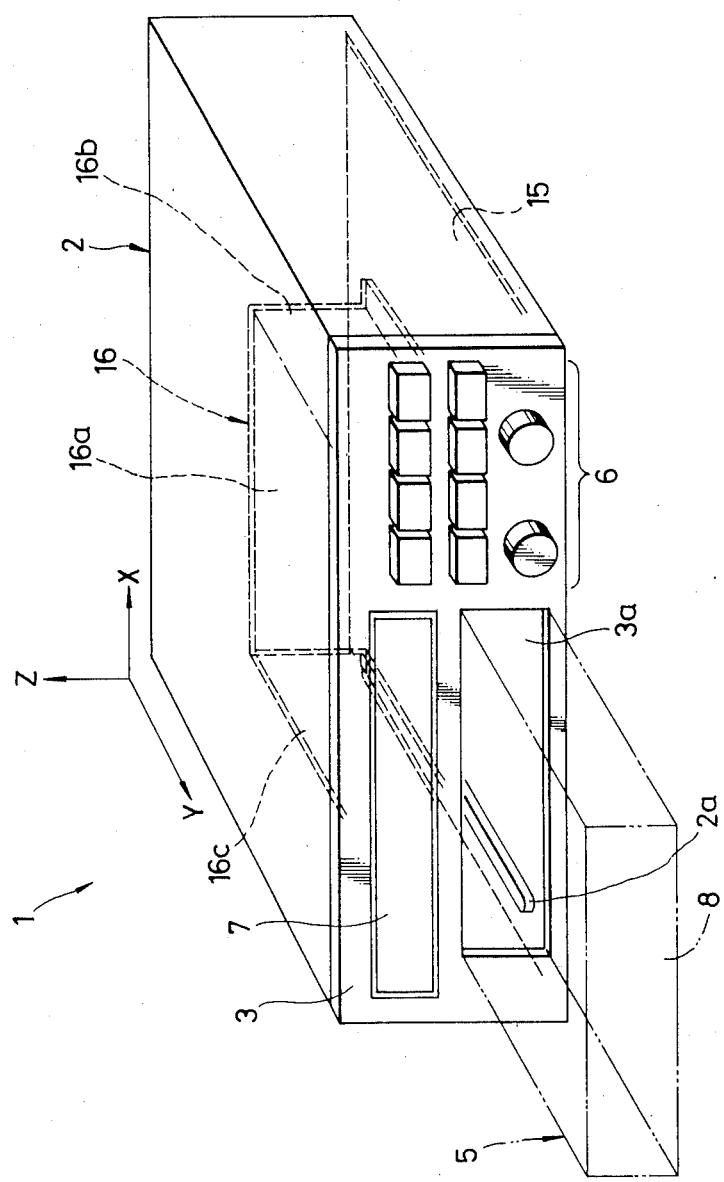
FIG. 1 is a perspective view of the whole body of a multidisk player embodying the present invention.

Referring now to the accompanying drawings, a description will be given of a multidisk player incorporating a disk holder embodying the present invention.

In the drawings, reference numeral 1 indicates the whole body of the multidisk player.

As shown in FIG. 1, the front panel 3 of a player housing 2 is provided with a rectangular opening 3a for accommodating a magazine 5 as a disk holder within the housing. The opening 3a extends both rightward and left-ward with respect to the forward direction indicated by the arrow Y, and the left-ward direction is indicated by the arrow X. The arrow Z indicates the upward direction. The front panel 3 is also provided with a group of control buttons 6 for manipulating the multi-disk player, and with a display 7.

As shown in FIGS. 2(a) to 2(c), the magazine 5 is composed of a generally flat parallelepiped body 8 as a housing, and two sets of three trays A and B, in the form of a rectangular plate, each carrying a disk 10 on its major surface. A set of trays A 11, a set of trays B 12 and, hence, the disks 10 are accommodated in an orderly fashion at a given pitch in a direction perpendicular to the disk-carrying face of a turntable (to be described hereinafter), or in this case in the vertical direction (both in the direction indicated by the arrow Z and in the opposite direction). Each of the trays A 11 and trays B 12 is provided rotatably about shaft 8a that extends through the magazine body 8 at its right rear end in the vertical direction (in which the trays are stacked); each tray is capable of moving on its major surface such that it is accommodated within or projects from the magazine body 8.

The construction of a magazine 5 will be described in more detail.

Figure 3A:
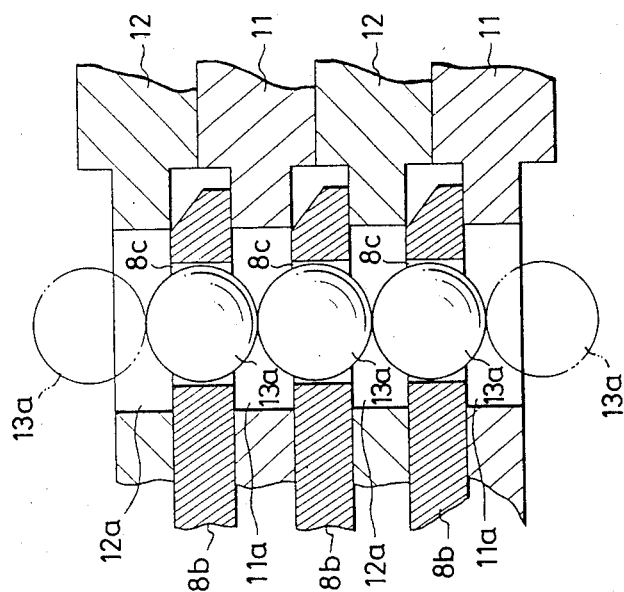
Figure 4A:
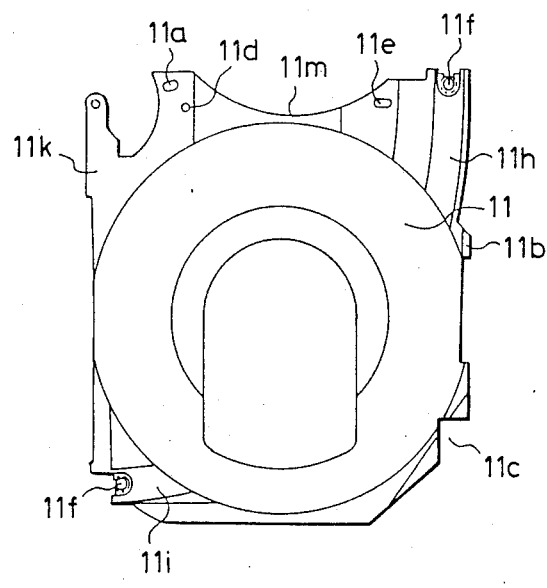
Figure 4B:
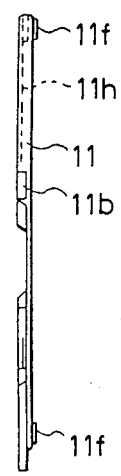
Figure 5A:
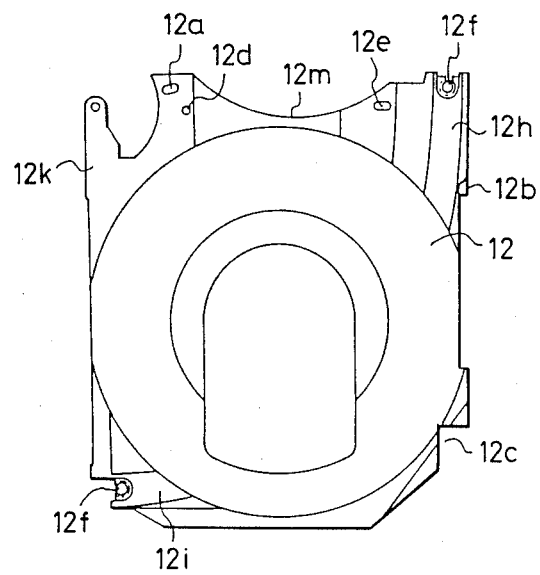
Figure 5B:
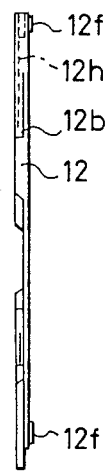

Seven partitions 8b are vertically (in the directions of an arrow Z and opposite thereto) lined up in a magazine body 8 and trays A11, B12 are arranged with the partitions sandwiched therebetween. As shown in FIG. 3(a), each partition 8b is provided with a circular concentric small opening 8c close to a rotation-supporting shaft 8a. FIGS. 4(a), (b) and FIGS. 5(a), (b) shows trays A11, B12 in detail. As shown in both drawings, the trays are provided with openings 11a, 12a capable of facing the openings 8c formed in the partitions 8b, respectively. The openings 8c formed in the partition 8b are called a first opening, whereas those openings 11a, 12a formed in the trays A11, B12 are called second openings. Five moving balls 13a are respectively fitted into the openings 8c, 11a, 12a in such a manner that they are movable along the direction (in the direction of an arrow Z and opposite thereto) in which the partitions 8b are arranged in parallel. The diameter of each moving ball 13a is equal to the pitch dimension of the trays 11, 12 alternatively arranged. Moreover, the moving pieces are energized by a pair of leaf springs 13b arranged at upper and lower ends of the magazine body 8 so as to move close to each other.

As shown in FIG. 2(b), a press lever 14 extending in the roughly longitudinal direction (in the direction of an arrow Y and opposite thereto) is installed at the left end of the magazine body 8 and one end of the press lever, i.e., the front end thereof is attached to the magazine body 8 through a pin 14a so as to freely rotate. In this case, the pin 14a extends vertically (in the directions of the arrow Z and opposite thereto). The other end of the press lever 14, i.e., the rear end thereof can smoothly mate with the free ends of each of the trays 11, 12. A spring member 14b engages with the press lever 14 and is used to energize the press lever 14 counterclockwise in FIG. 2(b) to provide it with tray-pressing force. A projection 14c is formed on the press lever 14 and the projection 14c abuts against the edge 3b of an aperture 3a in the player housing when the magazine 5 is isolated from the magazine-loading means in the player housing 2. The projection 14c so functions as to rotate the body of the press lever 14 by abutting against the edge 3b of the aperture 3a so that the trays 11, 12 are energized toward the containment position in the magazine body 8.

The press lever 14 and the spring member 14b constitute a press member for pressing the trays 11, 12 toward the containment position and the rotation-supporting shaft 8a in the magazine body 8. Moreover, the press member, the openings 8c (first opening) respectively formed in the partitions of the magazine body 8, the openings 11a, 12a (second openings) respectively formed in the trays 11, 12, the moving balls 13a and the leaf springs 13b constitute the holding means for holding the trays 11, 12 in the containment position of the magazine body 8.

As shown in FIGS. 4(a), (b) and 5(a), (b), the trays A11, B12 are identical in shape except that claws for being pulled by the finger of the listener when each tray is taken out of the magazine body 8 are different in shape and position. Cuts 11c, 12c with which the press lever 14 mate and pairs of jig-inserting holes 11d, 11e and 12d, 12e are formed in the free ends of the trays 11, 12, respectively.

Moreover, flexible members 11f, 12f made of synthetic leather are provided in fixed positions on the principal faces of adjoining trays, those faces being opposite to the disk-holding faces of the trays 11, 12 in such a manner as to project from the principal faces. The trays 11, 12 are provided with arcuate recesses 11h, 11i, 12h, 12i along the loci representing the movements of the flexible members 11f, 12f installed on the adjoining trays, respectively. The recesses 11h, 11i, 12h, 12i thus provided contribute to minimize the vertical dimension of six levels of the piled up trays 11, 12. In other words, the magazine 5 as a whole can be made thinner.

As shown in FIG. 2(c), a mating claw 5a is provided roughly in the center of the right side of the magazine 5 and allowed to freely rotate within a fixed range through a pin 5b at one end of the magazine body 8. Another mating claw 5c is provided at the front end on the right side of the magazine 5 and allowed to freely rotate within a fixed range through a pin 5d. The free end of the mating claw 5c is externally biased by a coil spring 5e. The free ends of the mating claws 5a, 5c can mate with the edge 3e of the aperture 3a (see FIGS. 1 and 2(b)).

The mating claws 5a, 5c and the coil spring 5e constitute the loading check means for checking the loading of the magazine 5 in the loading means in the player housing 2 when the loaded position is improper. In other words, when the magazine 5 is loaded upside down in the loading means, the claw 5a rotates under its own weight and project from the magazine 5, thus checking the loading of the magazine 5 as the free end thereof mates with the edge 3b of the above-described aperature 3a. When the longitudinally inverted magazine 5 is installed in the installation means, the mating claw 5c outwardly projected by the coil spring 5e mates with the edge 3b of the aperture 3a and checks the loading of the magazine 5.

Since the loading check means is constituted by simple members such as the mating claws 5a, 5c and the coil spring 5e, it is made simple in construction with cost reduction readily attainable.

Figure 3B:
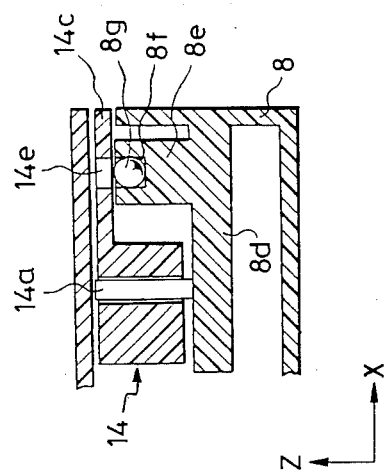

As shown in FIGS. 2(b), 3(b), a circular opening 14e is formed in the projection 14c of the press lever 14 provided in the magazine 5 and allowed to freely rotate. On the other hand, as shown in FIG. 3(b), an overhang 8d extending along the underside of the press lever 14 is provided for the magazine body 8 as the housing of the magazine 5 and a pillar-shaped projection 8e is formed on the overhang. A circular recess 8f is formed in the upper end of the projection 8d and a spherical ball 8g is inserted into the recess, the spherical ball being movable in the vertical direction (in the directions of the arrow Z and opposite thereto). The opening 14e formed in the projection 14c of the press lever 14 is able to face the recess 8f when the press lever is located in the position shown by an actual line of FIG. 2(b) and part of the spherical ball 8g is insertable into the opening 14e.

The press lever 14 and the moving piece 8g constitute the projection-regulating means for regulating the projection of the trays 11, 12 from the magazine body 8 when the magazine 5 as the disk holder is vertically inverted. In other words, when the magazine 5 is vertically inverted, the moving ball 8g is moved by its own weight and part thereof is inserted into the opening 14e of the press lever so as to regulate the rotation of the press lever 14 and thus the projection of the trays 11, 12 from the magazine body 8.

Since the projection-regulating means is constituted by members simple in shape such as the press lever 14 and the moving spherical piece 8g, it can be made simple in construction with cost reduction readily attainable. Moreover, what is sold on the market other than one especially prepared is usable as the spherical ball 8g.

As shown in FIG. 1, a chassis 16 as a support is fixed onto a bottom plate 15 fixedly installed within the housing 2. The chassis 16 consists of a flat side extending in the longitudinal direction (in the directions of the arrow Y and opposite thereto) and the traverse direction (in the directions of the arrow X and opposite thereto) and a pair of elevational sides 16b, 16c contiguous to both transversal ends of the flat side and extending in the longitudinal direction and vertical direction (in the directions of the arrow Z and opposite thereto, i.e., the direction in which each tray is arranged).

As shown in FIGS. 6 to 10, a moving member 18 is disposed between the rear ends of the pair of erect portions 16b and 16c in such a manner that it is movable in the vertical direction, or in the direction in which the trays 11 and 12 are stacked. Stated more specifically, the moving member 18 is composed of resin movable chassis A 19 (see FIGS. 11(a) and 11(b), which is connected by, for example screws to a steel tabular movable chassis B 20 (see FIG. 12) in such a manner that the movable chassis A 19 is fixed to the upper surface of the movable chasis B 20.

Figure 11A:
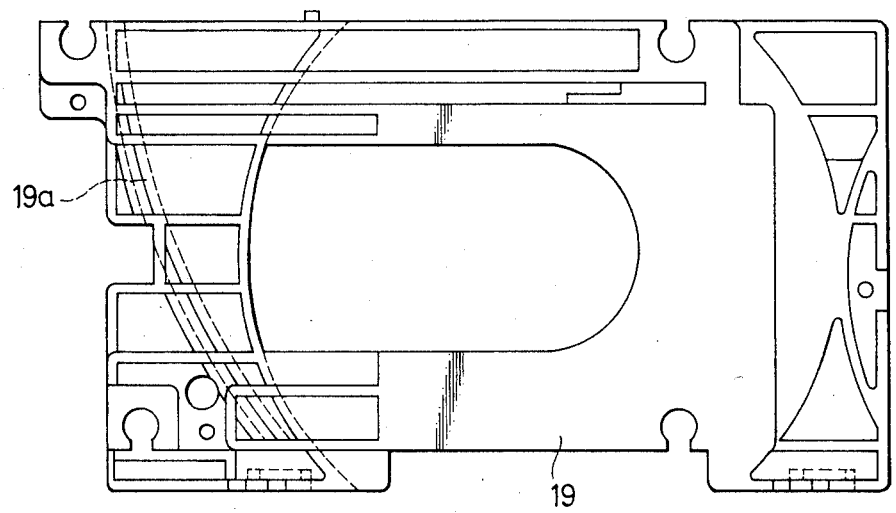
Figure 11B:
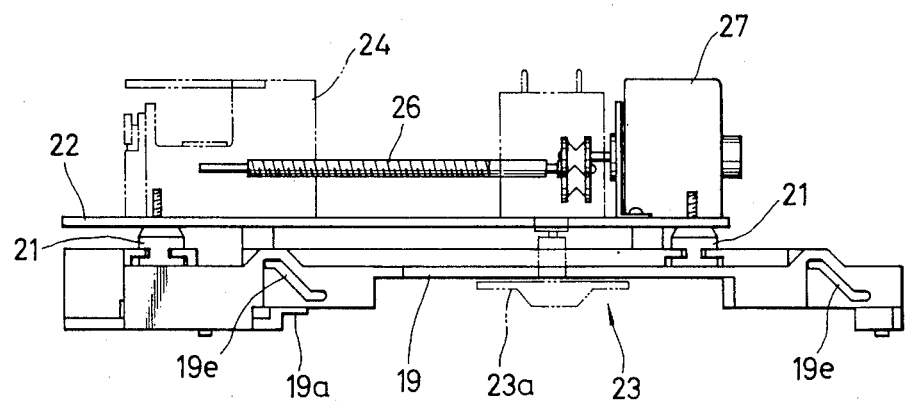

As is evident from FIG. 11(b), the upper surface of the resin movable chassis A 19 is provided with a carrier plate 22, with an anti-vibration member 21 (typically made of rubber) being inserted between the two members. A turntable 23 is mounted on the carrier plate 22. On the carrier plate 22 is also provided a carriage 24 bearing an optical pickup means; this carriage 24 is mounted on the carrier plate 22 such that it is movable within a plane including the disk bearing surface 23a of the turntable 23 in leftward and rightward directions (the direction indicated by the arrow X and the opposite direction). The carrier plate 22 is also provided with a means for driving the carriage 24 that is essentially composed of a screw shaft 26 threaded into part of the carriage 24 and a motor 27 for imparting a rotational force to said screw shaft.

The turntable 23, the carriage 24 including the optical pickup means, and the carriage drive means combine together to form a means for playing disks. This playing means is carried on the moving member 18 and is caused to move together with said moving member 18 in the vertical direction (i.e., both in the direction indicated by the arrow Z and in the opposite direction).

As shown in FIGS. 11(a) and 11(b), the underside of the movable chassis A 19 is provided with an arched guide face 19a which is capable of making sliding contact with the rotating end of each of the trays 11 and 12 that projects from the magazine body 8.

Figure 12:
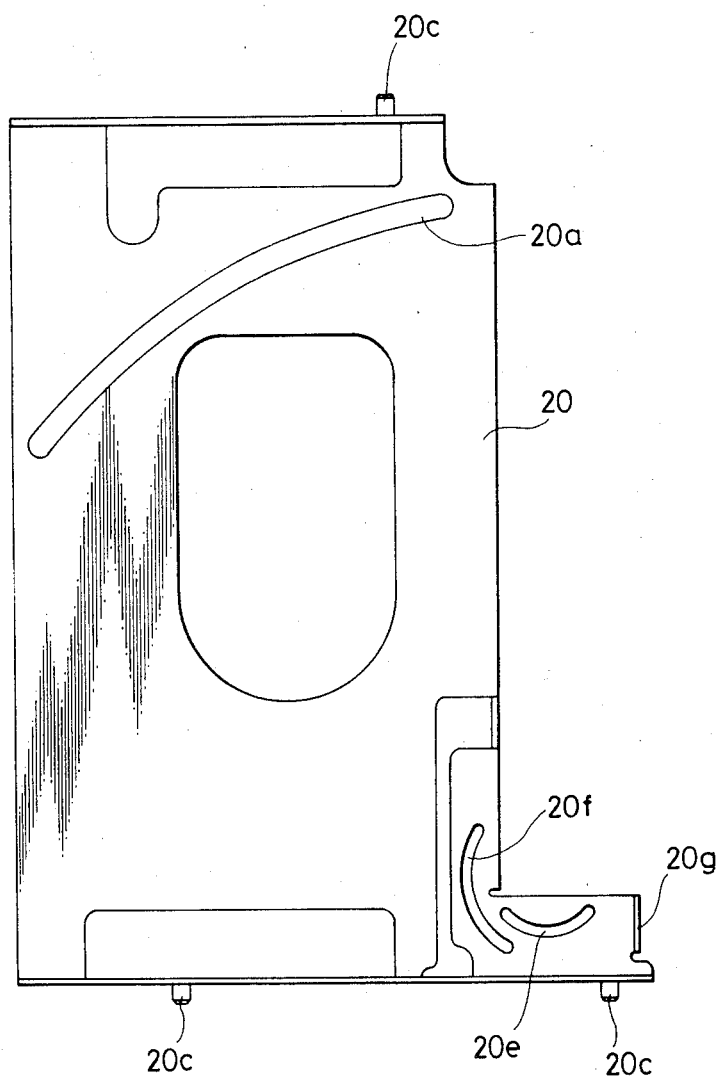

As shown in FIG. 12, the upper side of the movable chassis B 20 is provided with an arched guide projection 20a that is in a face-to-face relationship with the arched guide face 19a and spaced therefrom by a distance far greater than the thickenss of each of the trays 11 and 12 and which is capable of making sliding contact with the rotating end of each tray. The arched guide face 19a combines with the arched guide projection 20a to form a tray guide for guiding a single tray projecting from the magazine body 8.

Figure 6:
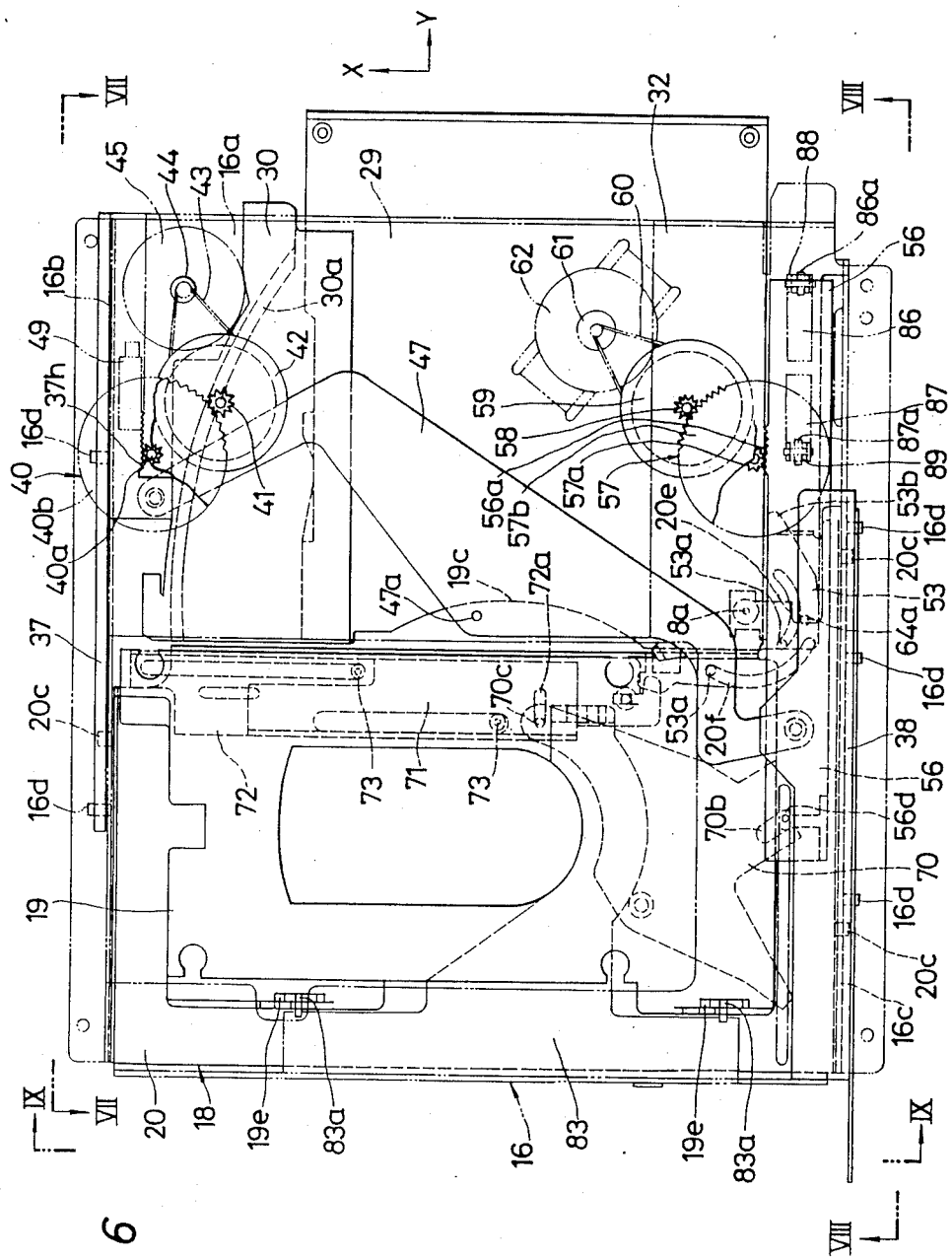
FIG. 6 is a plan view of the internal construction of the multidisk player.
Figure 9:
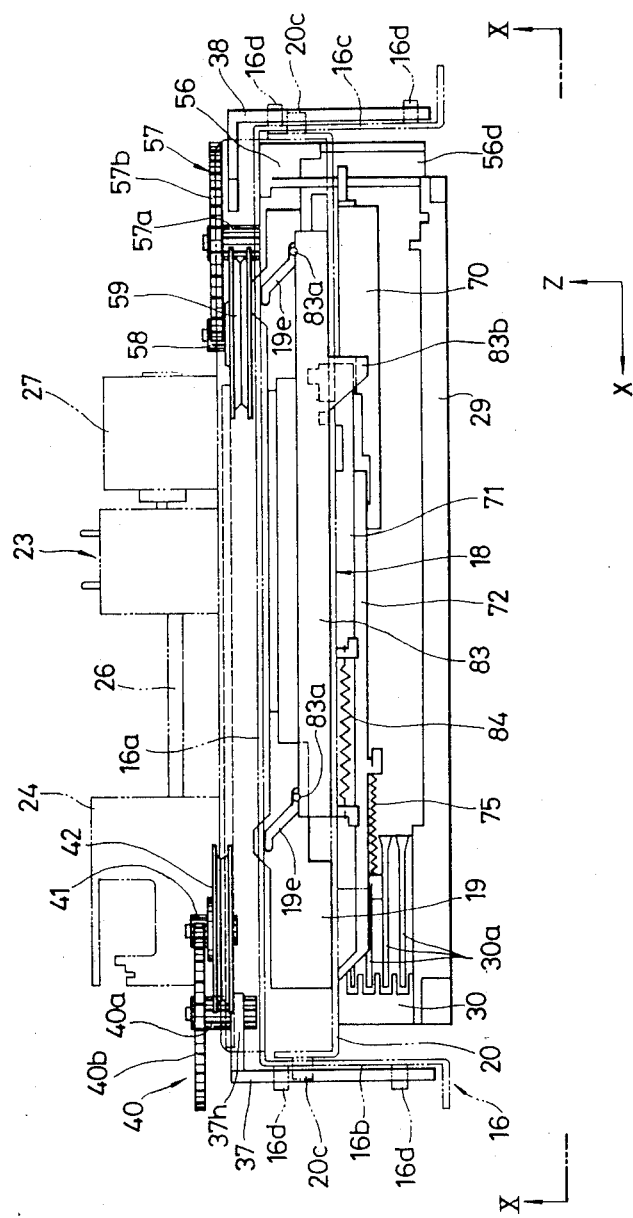
Figure 10:
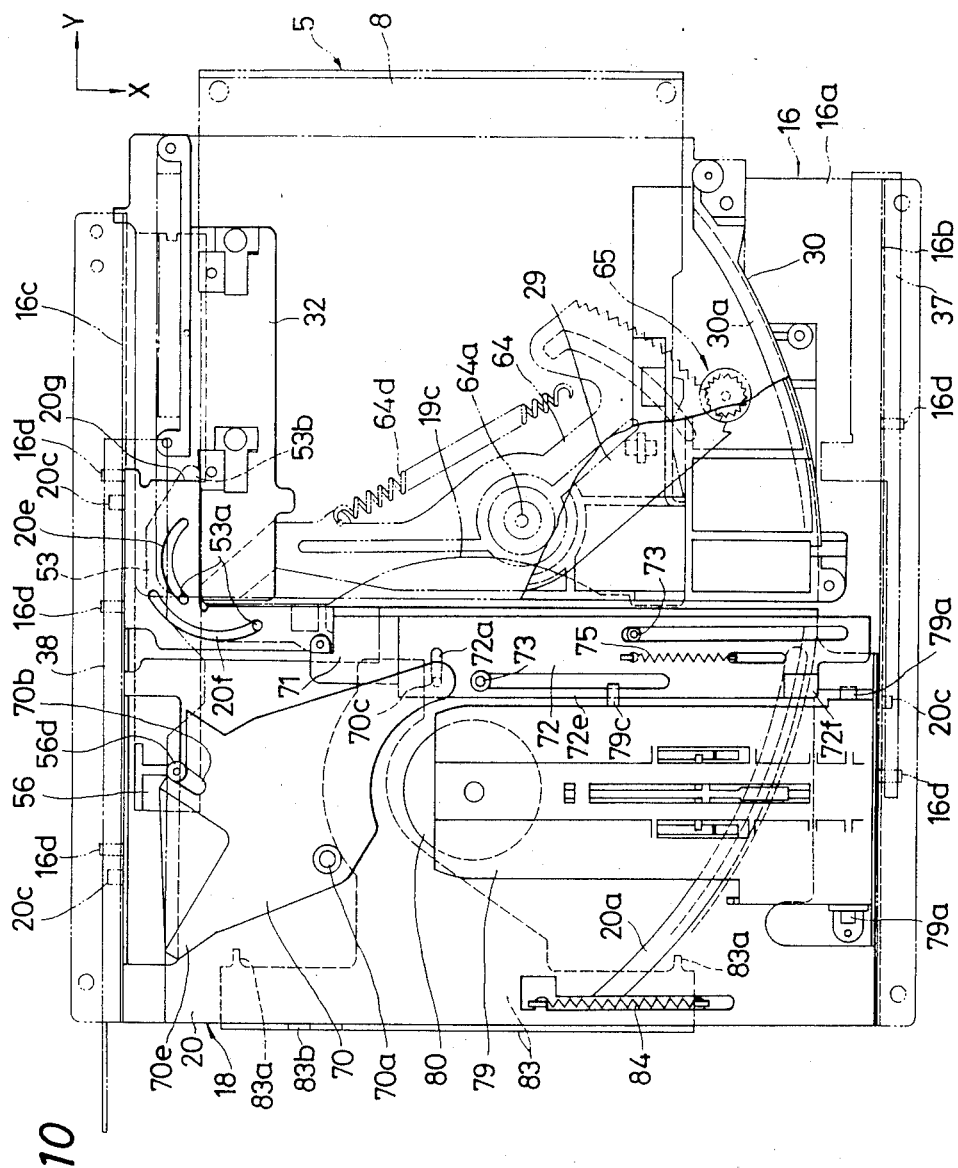
FIG. 10 is an arrow diagram taken on line X—X concerning FIG. 9.
Figure 13:
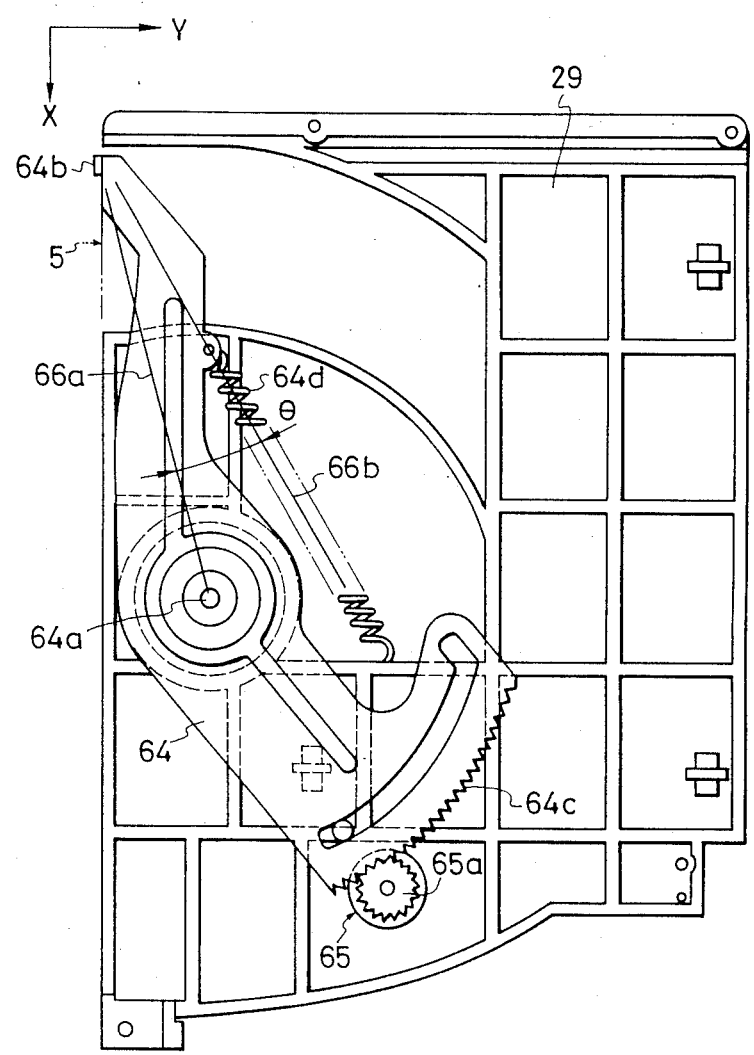

As shown in FIGS. 6, 9 and 10, a tabular guide/hold member 29 that makes sliding contact with the underside of the magazine 5 for guiding and holding the latter is disposed between the front ends of the erect portions 16b and 16c of the chassis 16. This member 29 is secured to the planar portion 16a of the chassis 16 by, for example, a screw. Details of the guide/hold member 29 are shown in FIG. 13. A tray guide member 30 is provided on top of the left end of the guide/hold member 29. The tray guide member 30 is provided with a plurality of arched tray guide grooves 30a that are positioned between the tray guide (composed of the arched guide face 19a and the arched guide projection 20a) and the tray guide channel in the magazine body 8 and which are continuous from each of these members. The trays 11 and 12 projecting from the magazine body 8 slide along the tray guide grooves 30a as they are kept in engagement therewith and are thereafter guided into the already described tray guide on the moving member 18. The tray guide channel in the magazine body 8 is composed of 18c and 8b (see FIG. 3) and is provided with a plurality of guide grooves (not shown) similar to the guide grooves 30a.

Figure 14:
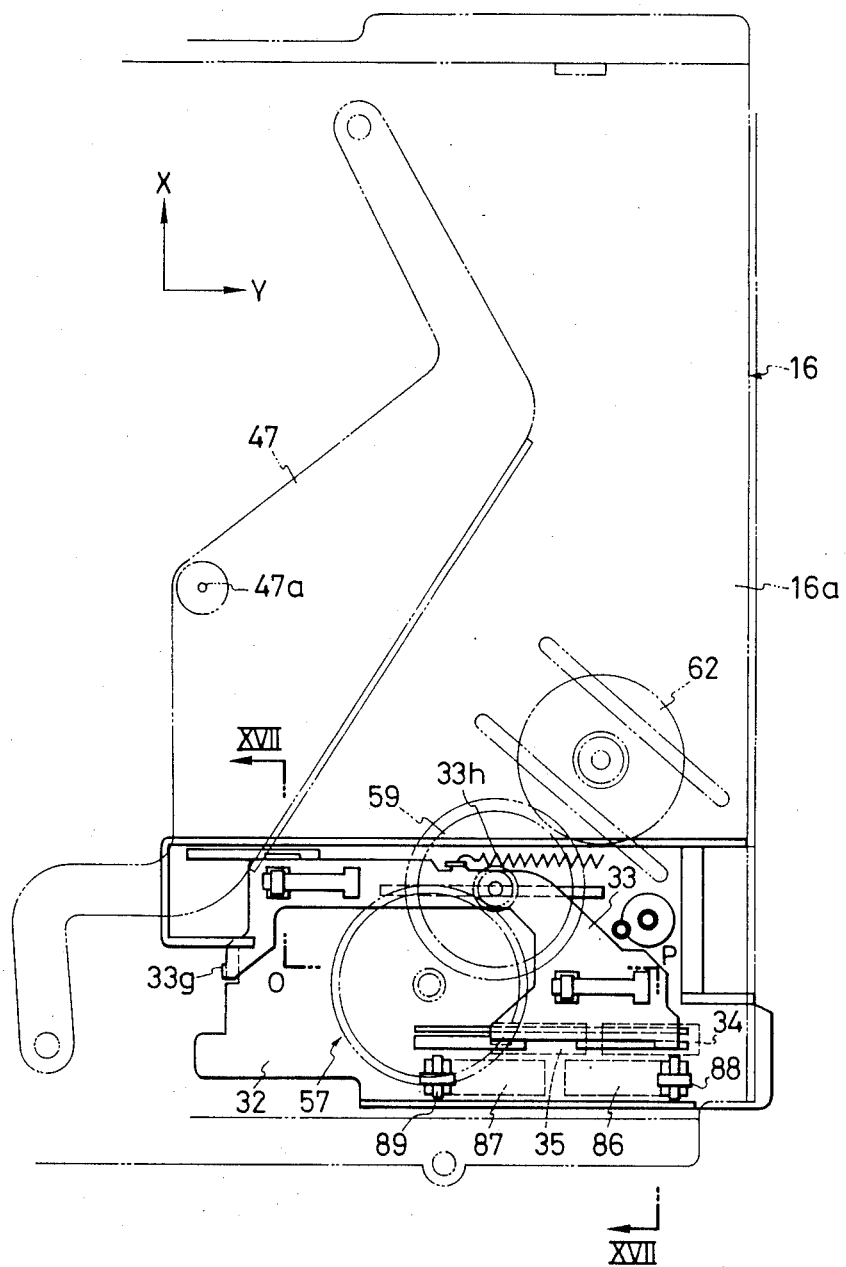
Figure 16A:
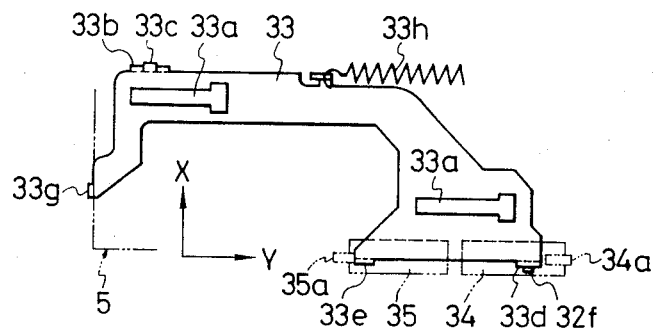
Figure 17:
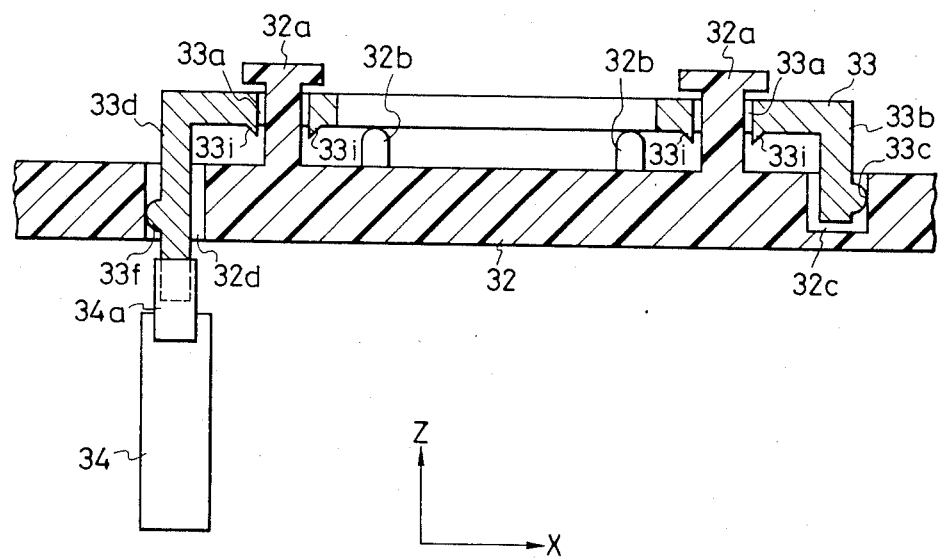

As shown in FIGS. 6, 10, and 14, a plastic support 32 is arranged close to the magazine-loading means, i.e., on the right-hand side thereof within the player housing 2 and fixed to the underside of the flat side 16a of the chassis 16 with screw bolts. FIGS. 15(a) through (c) show the support 32 in detail. As shown in FIG. 14, a steel moving lever 33 is movably attached to the surface of the support 32 along the magazine-loading direction, i.e., in the longitudinal direction (in the directions of the arrow Y and opposite thereto). FIGS. 16(a), (b) show the moving lever 33 in detail. As shown in FIGS. 15(a) through (c), 16(a), (b), the moving lever 33 is attached in such a manner that a pair of linear slits 33a extended and formed in the longitudinal direction of the moving lever slidably mate with T-shaped projections 32a of the support 32. As shown in FIG. 17, bosses 32b for smoothly abutting against the underside of the moving lever 33 and supporting the moving lever 33 are provided on the surface of the support.

An overhang 33b extended downward is formed at the left rear end of the moving lever 33 and slidably mates with a linear groove 32c extended in the longitudinal direction and formed in the left end surface of the support 32. In thise case, a boss 33c is formed on the left side of the overhang 33b and smoothly abuts against the left wall of the linear groove 32c. Moreover, two overhangs 33d, 33e extended downward and also set apart from each other in the longitudinal direction (in the directions of the arrow Y and opposite thereto) are formed at the right front end of the moving lever 33. The overhangs 33d, 33e slidably mate with two linear openings 32d, 32e extended and formed in the longitudinal direction at the right front end of the support 32. A boss 3f is formed on the right side of the overhang 33d and smoothly abuts against the right wall of the linear opening 32d.

Figure 16B:
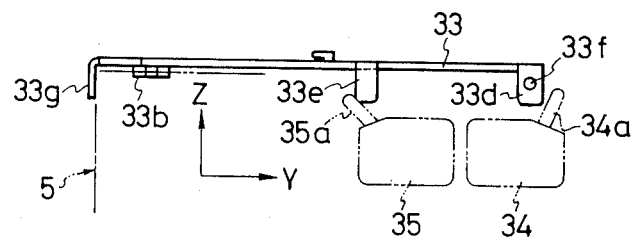

As shown in FIGS. 16(a) and 16(b), an overhang 33g protruding downward is provided at the rear end of the moving lever 33 and the rear end of the magazine 5 is allowed to mate therewith. In other words, the moving lever 33 is caused to move rearward by the mating of the rear end of the magazine 5 with the overhang 33g. Moreover, a coil spring 33h for biasing the moving lever 33 forward (in the direction of the arrow Y) is coupled to the moving lever 33.

As shown in FIGS. 14, 16(a), (b), a pair of detecting switches 34, 35 are arranged beneath the moving lever 33, so that the overhangs 33d, 33e of the moving lever 33 operate actuator elements 34a, 35a by mating with them.

The moving lever 33 and the detecting switches 34, 35 constitute the loaded magazine-detecting means for detecting the loading of the magazine 5 in the magazine loading means in the player housing 2.

As shown in FIG. 17. although burrs 33i produced when the linear slits 33a are made by punching are left on the edges of the pair of the linear slits 33a formed on the moving lever 33, the support 32 is prevented from touching the burrs by attaching the moving lever 33 to the support 32 in the aforementioned manner.

A description will subsequently be given of a moving means for moving the moving member 18 consisting of the moving chassis A19, B20 vertically (in the directions of the arrow Z and opposite thereto).

As shown in FIGS. 6 through 10, a pair of longitudinally movable plates 37, 38 as moving members longitudinally extended are provided on the outer faces of the left and right elevational sides 16b, 16c of the chassis 16. As shown in FIGS. 7, 8 guide grooves 37a, 37b and 38a, 38b extending in the longitudinal direction of the moving plates 37, 38 are formed therein, respectively. Each of the moving plates 37, 38 is attached to the chassis 16 as the support when the guide groove externally movably mates with the pin 16d projected from the outer face of each of the elevational sides 16b, 16c. That is, the moving plates 37, 38 are allowed to reciprocate in the longitudinal direction.

For the purpose of the following discussion, let the moving member 18 composed of the movable chassis A 19 and the movable chassis B 20 be referred to as the first moving member, and let the combination of the moving plates 37 and 38 be called the second moving member. As is clear from FIGS. 7 and 8, the guide grooves 37b and 38b are formed in the moving plates 37 and 38, respectively, at positions closer to one side with respect to the direction in which these plates are moved (i.e., the lower side in the embodiment shown), but the other set of guide grooves 37a and 38a are positioned farther away from the lower side of either plate.

The movable chassis B 20 which is one of the two components of the first moving member 18 is provided with three projecting pins 20c, one being on the left side and two on the right side. As is clear from FIGS. 7 and 8, one pin 20c is movably fitted through a guide groove 16e formed in the vertical direction in the left-hand erect portion 16b of the supporting chassis 16, while the other two pins 20c are movably fitted through guide grooves 16e formed in the vertical direction in the right-hand erect portion 16b of the supporting chassis 16, while the other two pins 20c are movably fitted through guide grooves 16e formed in the vertical direction in the right-hand erect portion 16c of the chasis 16. By this arrangement, the movable chassis B 20 is guided in the vertical direction.

For the purpose of the following description, let the guide grooves 16e formed in the chassis 16 be referred to as the first group of guide grooves, and let the guide grooves 37b and 38b formed in the moving plates 37 and 38 (i.e., forming the second moving member) be called the second group of guide grooves.

The pins 20c studded on both the right and left sides of the movable chassis B 20 project to the outside of the chassis 16 through the guide grooves 16e formed in that chassis, and cam grooves 37d and 38d formed in the inside surfaces of the moving plates 37 and 38 (i.e., forming the second moving member) are in movable engagement with these pins 20c. The overall shape of the cam groove 37d formed in the moving plate 37 is such that it is inclined both in the forward direction (as indicated by the arrow Y) and in the downward direction (opposite to the direction indicated by the arrow Z). On the other hand, the overall shape of the cam groove 38d formed in the moving plate 38 is such that it is inclined both in the forward direction and in the upward direction. In other words, the cam grooves 37d and 38d are formed such that when the moving plates 37 and 38 (i.e., forming the second moving member) make relative movements, the first moving member 18 (composed of the movable chassis A 19 and the movable chassis B 20) will move in the vertical direction.

The cam groove 37d (or 38d) is formed between the guide groove 37b (or 38b), which is formed on one side (i.e., lower side) with respect to the direction in which the moving plate 37 (or 38) moves, and the other side (i.e., upper side) of said moving plate. The cam groove 37d (or 38d) is composed of 6 linear portions 37e (or 38e) extending in the direction in which the moving plate 37 (or 38) moves (i.e., in forward and backward directions) and 5 bridge portions 37f (or 38f) that connect these linear portions and are inclined with respect thereto; because of this arrangement, the cam groove 37d (or 38d) has an overall configuration resembling a staircase. As shown in FIGS. 7 and 8, one end of the cam groove 37d (or 38d) is in alignment with one end of the guide groove (second guide groove) 16e formed in the chassis 16.

As will be apparent from the foregoing description, the moving member 18 (or the movable chassis B 20 which is one component of the moving member) is supported at three points with respect to the supporting chassis 16 by means of the pins 20C and the moving plates 37 and 38. As is clear from FIG. 10, one of these support points (i.e., the position of pin 20c) is disposed in the vicinity of the junction between the tray guide groove 30a in the tray guide member 30 and the tray guide on the moving member 18 (as composed of the arched guide face 19a on the movable chassis A 19 and the arched guide projection 20a on the movable chassis B 20).

The advantage of disposing one of the three support points for the moving member 18 at the position described above is that the position of the tray guide on the moving member 18 can be determined with high precision with respect to the tray guide groove 30a, thereby ensuring smooth and precise transport of disks.

As shown in FIGS. 6 and 9, the left-hand moving plate 37 is provided at the right front end with a rack 37h that extends in the direction in which said moving plate extends. This rack 37h meshes with the small gear wheel 40a on a double gear 40 that is provided on the planar portion 16a of the chassis 16. The large gear wheel 40b on the double gear 40 is coupled to the output shaft of a motor 45 by means of a gear wheel 41, a pulley 42 that is integral with said gear wheel 41, a belt 43 and a small pulley 44. Between the left-hand moving plate 37 and the right-hand moving plate 38 is provided a pivoting lever 47 that is mounted generally in the center of the planar portion 16a of the chassis 16 such that it is pivotable about a support shaft 47a extending in the vertical direction (both in the direction indicated by the arrow Z and in the opposite direction). The opposite ends of the lever 47 are brought into engagement with right and left movable plates 37, 38.

The double gear 40 as combined with the gear wheel 41, the pulley 42, the belt 43, the small pulley 44, the motor 45, the pivoting lever 47 and associated minor peripheral members make up a means for imparting a driving force to the moving plates 37 and 38 forming the second moving member. This driving force imparting means as combined with the moving plates 37 and 38 forming the second moving member make up a means for causing the moving member 18 composed of the movable chassis A 19 and the movable chassis B 20 to move in the vertical direction (both in the direction indicated by the arrow Z and in the opposite direction).

As shown in FIG. 7, a sensor switch 49 is provided on the inner surface of the left-hand erect portion 16b of the chassis 16. This sensor switch 49 checks to see if the moving plate 37 as one component of the second moving member which is reciprocating in forward and backward direcitons is at its most retracted limit position (the position for the limit of the forward movement); the switch is actuated when its actuator comes into engagement with a projection 37i studded on the left-hand surface of the moving plate 37. The right-hand surface at the front end of the moving plate 37 is provided with an address plate 50 having six slits 50a aligned in the direction in which said moving plate 37 moves. At the rear of the sensor switch 49 is provided a photosensor 51 for detecting each of the slits 50a in the address plate 50. For the purpose of the following description, let the sensor switch 49 be referred to as the first sensor, and the photosensor 51 as the second sensor. A series of slit detection signals from the second sensor are fed to a counter (not shown) where they are counted. A unit (not shown) for performing automatic control of the multi-disk player is contained at a predetermined location in the housing 2 and this control unit used the output from the counter in order to determine the position where the moving plate 37 has stopped.

The first sensor (sensor switch) 49 as combined with the address plate 50, the second sensor (photosensor) 51, the counter and the control unit make up a positioning mechanism by which the moving plate 37 is moved to a desired address position and has its location determined at that position. If a command for moving is supplied while the second sensor (photosensor) 51 is issuing slit detection signals, said positioning mechanism causes the moving plate 37 to move by a distance proportional to the difference between the present address and the desired address. If a command for moving is supplied when the photosensor 51 is issuing no slit detection signal, the positioning mechanism will cause the moving plate 37 to move to the position of the desired address after the plate has been moved (in the backward direction) to a position where a detection signal can be obtained from the first sensor (sensor switch) 49.

Figure 18:
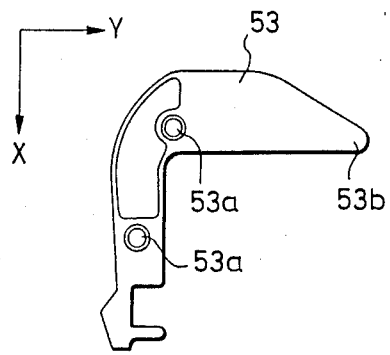

As shown in FIGS. 6 and 10, the movable chassis B 20 which is one component of the moving member 18 is provided at the upper right-hand front end with a tray projecting member 53 that engages with each one of the trays 11 and 12 within the magazine 5 so as to cause the individual trays to be projected to the outside of the magazine body 8. Details of the tray projecting member 53 are shown in FIG. 18. As one can see from FIG. 18, the tray projecting member 53 has a generally L-shaped overall view and is guided by means of a pair of pins 53a that are studded on the tray projecting member and which make movable engagement with two arched guide grooves 20e and 20f (see, for example, FIG. 12) having different radii that are formed in the movable chassis B 20. The pins 53a are slightly long with respect to the guide grooves 20e and 20f so that the tray projecting member 53 has a small clearance in the direction in which the trays are stacked. Stated more specifically, the tray projecting member 53 rotates about the center of curvature of each of the arched guide grooves 20e and 20f so that the rotating end 53b of the member 53 will push the trays 11 and 12 to project from the magazine body 8. In this connection, it should be mentioned that as is clear from FIGS. 2(b) and 6, the imaginary axis of rotation of the tray projecting member 53 (i.e., the center of curvature of the guide groove 20e or 20f) coincides with the axis 8a around which each of the trays 11 and 12 will rotate. The tray 11 (or 12) is caused to project to the outside of the magazine body 8 as a result a portion 11k (or 12k) close to the axis of rotation 8a (see FIGS. 2(b), 4(a), 5(a)) being pushed by the tray projecting member 53.

The tray projecting member 53 is made of a comparatively soft resin and its rotating end 53b is made flexible in the vertical direction, or in the direction in which the trays 11 and 12 are stacked. In addition, as mentioned in the previous paragraph, the tray projecting member 53 is provided with a small clearance in the vertical direction. Because of its flexibility, if part of the rotating end 53b is inserted into the tray guide channel (described hereinbefore) in the magazine body 8, it will move along this tray guide channel. In its inoperative mode, the rotating end 53b of the tray projecting member 53 engages with a Y-shaped groove 20g in the movable chassis B 20 (FIG. 10) and makes a limited movement in the upward direction (as indicated by the arrow Z).

The tray projection member 53 is provided on the movable chassis B 20 which is one component of the moving member 18. Therefore, the moving member moving means (composed of the moving plates 37 and 38, etc.) as combined with the positioning mechanism including the address plate 50 make up a tray projecting member moving means that will cause both the tray projecting member 53 and the moving member 18 to move to the position where said member 53 engages with the tray (11 or 12) carrying the disk 10 to be played.

The trays 11 and 12 are caused to project from the magazine body 8 by rotating and driving the tray projecting means 53, and the means driving the tray projecting member is described hereinafter.

Figure 19A:
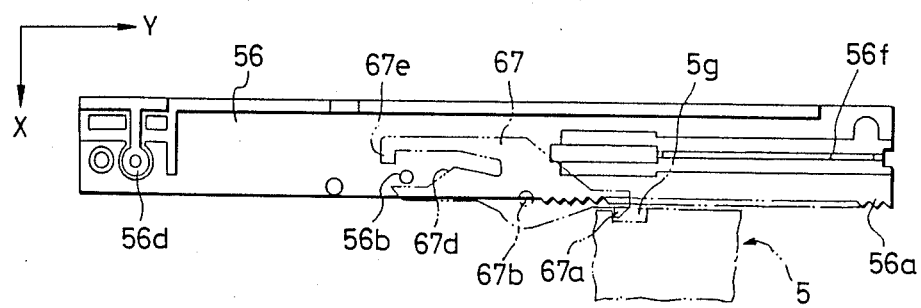
Figure 19B:
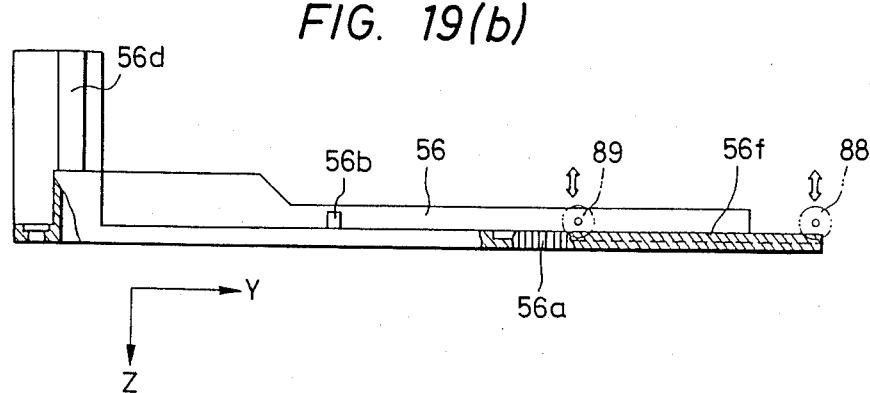

As shown in FIGS. 6, 9 and 10, a moving body 56 that extends in forward and backward directions is arranged on the right-hand side of the chassis 16 and mounted thereon in such a manner that it is freely movable in the direction in which its extends. Details of the moving body 56 are shown in FIGS. 19(a) and 19(b). The moving body 56 is provided at the left-hand front end with a rack 56a that extends in the direction in which said moving body extends. This rack 56a meshes with the small gear wheel 57a on a double gear 57 that is provided on the planar portion 16a of the chassis 16. The large gear wheel 57b on the double gear 57 as coupled with an output shaft of a motor 62, which is a torque generating means, through a gear wheel 58, a pulley 59 that is integral with said gear wheel 58, a belt 60, and a small pulley 61. The combination of the double gears 57, gear 58, pulley 59, belt 60, small pulley 61, motor 62 and associated minor peripheral members make up a means for imparting a driving force to the moving body 56.

As shown in FIGS. 10 and 13, an oscillating lever 64 for ejecting the magazine 5 loaded on the magazine-loading means outwardly therefrom is extended in a transverse direction, arranged close to the deepest portion of the magazine-loading means in the player housing 2 and furthermore attached to roughly the center of the underside of the guide-holding member 29 through a pin 64a. In this case, the pin 64a is extended vertically (in the directions of the arrow Z and opposite thereto). As is clear from FIG. 13, an overhang 64b extending upward is projected from the right end of the oscillating lever 64, which abuts against the rear end of the magazine 5 in the overhang portion. Moreover, a gear 64c with the pin 64a as its curvature radius is formed at the left end of the oscillating lever 64 and a control gear 65a attached to a damper 65 engages with the gear 64c. The damper 65 provides control force with the viscosity resistance of a viscous agent such as grease held inside the damper 65. The oscillating lever 64 is supplied by the coil spring 64d with the force for ejecting the magazine.

The oscillating lever 64, the damper 65 and the coil spring 64d constitute the ejection means for ejecting the magazine 5 from the magazine-loading means within the player housing 2. As is obvious from FIG. 13, given that an angle formed between a straight line 66a connecting the center (pin 64a) of rotation of the oscillating lever 64 and the point (overhang 64b) where the oscillating lever mates with the magazine 5, and a straight line 66b passing through the center of a coil spring 64d is $\theta$, the coil spring 64d is always positioned so as to make that angle $\theta$ acute, irrespective of the angle of oscillation of the oscillating lever 64. Consequently, the force for ejecting the magazine provided by the coil spring 64d for the oscillating lever 64 is always kept constant, irrespective of the oscillating angle of the oscillating lever 64.

As shown in FIG. 19(a), a lock member 67 for locking the magazine to the player housing 2 in the position of installation by the mating of one revolving end 67a thereof with the mating recess 5g (see FIGS. 2(b), (c)) of the magazine 5 is provided rotatably around a pin 67b close to the moving body 56. The position of the lock member 67 shown in FIG. 19(a), i.e., the position where the lock member locks the magazine is called a first position, whereas the position where the one revolving end 67a is isolated from the mating recess 5g of the magazine after it has revolved counterclockwise of FIG. 19(a) by a fixed angle, i.e., the position where the locked state is released is called a second position. The lock member is so energized by a spring member (not shown) as to make the revolving one end 67a fit into the mating recess 5g of the magazine 5. As shown in FIG. 19(b), a pin 56b is projected from a fixed position on the surface of the moving body 56 and a tapered means 67d formed at the other revolving end of the lock member 67 is allowed to mate with the pin. In other words, the above locked state of the magazine 5 because of the lock mechanism consisting of the lock member 67 and the spring member (not shown) is released as the moving body 56 moves forward. A bend 67e extended roughly to the left is formed at the other revolving end of the lock member 67 and, when the lock member is located close to the second position, the bend 67e mates with the pin 56b of the moving body 56, whereby the backward movement of the moving body is regulated.

Figure 20:
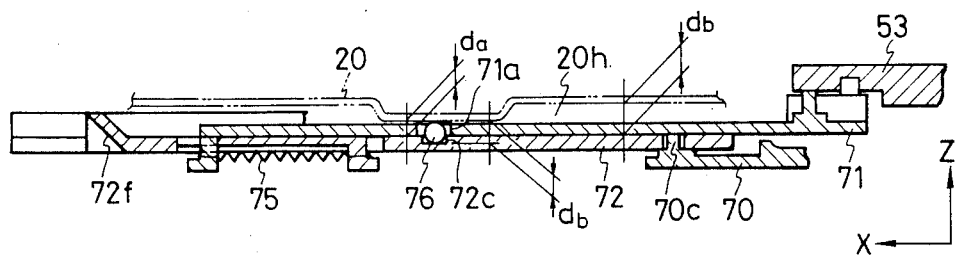
Figure 21:
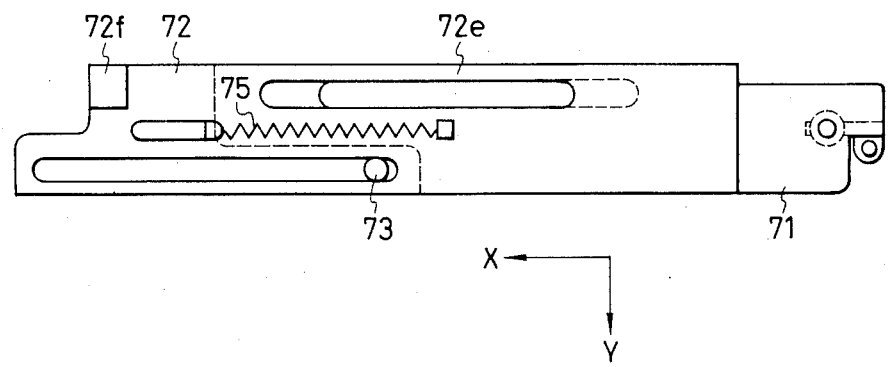
Figure 22A:
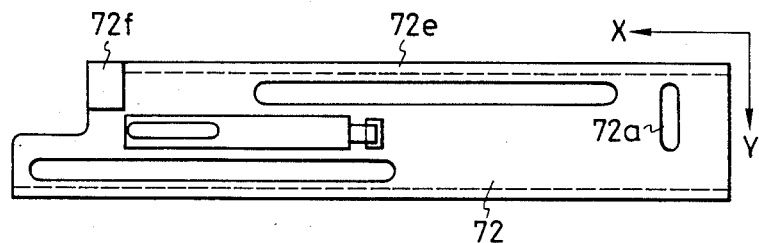
Figure 22B:
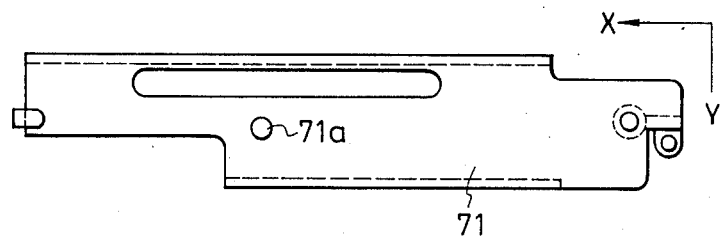

As shown in FIGS. 6, 9 and 10, the underside of the moving member 18 (or the movable chassis B 20 which is one component of said member 18) that moves in the vertical direction (both in the direction indicated by the arrow Z and in the opposite direction) is provided with an intermediate lever 70 that is pivotally mounted on a pin 70a. One pivoting end of the intermediate lever 70 is provided with a U-shaped notch 70b that is capable of smooth engagement with a cylindrical engaging portion 56d formed to extend in the vertical direction through the rear end of the moving member 56. As is also shown in FIGS. 20 and 21, the movable chassis B 20 is provided at its lower front end with a first lever member 71 and a second lever member 72 each extending in rightward and leftward directions; these levers 71 and 72 are mounted on the movable chassis B 20 by means of a plurality of pins 73 such that the levers will be capable of reciprocating in the directions in which they extend. Details of the second and first levers 72 and 71 are shown in FIGS. 22(a) and 22(b), respectively. As shown, for example in FIG. 10, a pin 70c is studded on the other pivoting end of the intermediate lever 70 and this pin is slidably fitted in a slot 72a formed at the right-hand end of the second lever member 72 to extend in forward and backward directions. Stated more specifically, if the moving body 56 reciprocates in forward and backward directions (in the direction indicated by the arrow Y and in the opposite direction), the intermediate lever 70 will rotate around the pin 70a, whereby the second lever member 72 is caused to reciprocate in leftward and rightward directions (in the direction indicator by the arrow X and in the opposite direction). The above-described moving body 56 a combined with the means (including the motor 62) for imparting a drive force to the moving body 56, the intermediate lever 70 and associated minor peripheral members make up a mechanism for driving the second lever member 72. It is to be mentioned that the first lever member 71 engages with the tray projecting member 53 at its right-hand end and is capable of rotating said lever member as a result of movement in the advancing direction (or movement to the right). The second lever member 72 serves to move the support (to be described hereinafter) which is one component of the clamping mechanism to be also described hereinafter.

As shown in FIGS. 10, 20 and 21, the first lever member 71 is connected to one end of a coil spring 75 that will urge said lever member in the direction of its advancement or in the rightward direction (opposite to the direction indicated by the arrow X). The coil spring 75 is incorporated in such a manner that it connects the first and second levers 71 and 72, with the other end of the spring 75 being connected to the second lever member 72.

As shown in FIG. 20, the underside of the movable chasis B 20 is provided with first recess 20h extending in leftward and rightward directions (both in the direction indicated by the arrow X and in the opposite direction), and the upper surface of the second lever member 72 is provided with a second recess 72c that is capable of maintaining a face-to-face relationship with said first recess 20h. The first lever member 71 which is so positioned as to be sandwiched between the movable chassis B 20 and the second lever member 72 is provided with an opening 71a that is capable of maintaining a face-to-face relationship with these first and second recesses 20h and 72c. The opening 71a contains a movable slider ball 76 that is capable of engaging with the first recess 20h and the second recess 72c. The dimension indicated by da in FIG. 20, or the distance between the opposing faces of the movable chassis B 20 and the second lever member 72 within the limits of their relative movement, is smaller than the outside dimension of the movable slider 76. The dimension indicated by db in FIG. 20, or the distance by which any one of the opposing surfaces of the movable chassis B 20 and the second lever member 72 is spaced from the bottom surface of either one of the first recess 20h and the second recess 72c which is in a face-to-face relationship with any one of said opposing surfaces, is slightly larger than the outside dimension of the movable slider 76.

The first and second recesses, 20h and 72c, as combined with the opening 71a, the movable slider 76 and associated minor members make up a lock/unlock means that locks the first and second lever members 71 and 72 and which, when the locked lever members advance in the rightward direction (opposite the direction indicated by the arrow X) until the first lever member 71 has reached an area in the vicinity of its most advanced position (i.e., the position where the tray projecting member 53 rotated by the first lever member has caused the trays 11 and 12 to project fully from the magazine body 8), unlocks said lever members 71 and 72. After being unlocked from the second lever member 72, the first lever member 71 will make a slight movement toward its most advanced position by means of the urging force exerted by the aforementioned coil spring 75. In addition, while the first lever member 71 is making said slight movement, the arched portions 11m and 12m of the trays 11 and 12 (see FIGS. 4(a) and 5(a)) contact an arched contact portion 19c formed on the movable chassis A 19 (see FIGS. 6 and 10), whereby the disk 10 carried on each of these trays is positioned concentrically with, or right under, the disk-carrying surface 23a (see FIG. 11(b)) of the turntable 23.

The lock/unlock means (composed of the movable slider 76 and associated members) as combined with the first and second lever members 71 and 72, the coil spring 75 as the urging means, and the second lever member 72 driving mechanism including the moving body 56 and the motor 62 (as already described) make up a tray projecting member drive means that rotates and drives the tray projecting member 53 (FIG. 18) so as to cause the trays 11 and 12 to project from the magazine body 8.

Said tray projecting member drive means as combined with the chassis 16 (i.e., supporting member), the moving member 18 (i.e., the first moving member composed of the movable chassis A 19 and the movable chassis B 20), the tray projecting member 53 and the tray projecting member moving means composed of the moving plates 37, 38, etc. make up a tray projecting means that causes the tray 11 or 12 carrying the desired disk 10 to project from the magazine body 8.

As shown in FIG. 10, the lower left-hand side of the moving member 18 (or the movable chassis B 20 which is one component of said member) is provided with a support 79 that extends in both leftward and rightward directions (the direction indicated by the arrow X and the opposite direction) and which is mounted on the movable chassis B 20 such that it is capable of swinging about a pin 79a provided at its left end. Since the pin 79a extends in forward and backward directions (both in the direction indicated by the arrow Y and in the opposite direction), the support 79 will swing in a plane perpendicular to the disk-carrying surface 23a of the turntable 23 (see FIG. 11(b)). The free end of the support 79 is rotatably provided with a disk-shaped depressing member 80 that makes contact with the side of the disk 10 which is opposite the side facing the turntable 23 so as to clamp the disk in cooperation with said turntable. The support 79 is also provided with a coil spring (not shown) that urges said support in such a direction that the depressing member 80 will approach the disk-carrying surface 23a of the turntable 23.

The above-described support 79, depression member 80 and associated members make up a clamp mechanism for clamping the disk.

As shown in FIG. 10, a forwardly extending pin 79c is studded on the free end of the support 79 and this pin engages with a planar guide portion 72e at the upper rear edge of the second lever member 72. A tapered portion 72f that is capable of engaging with the pin 79c on the support 79 is formed at a position that is on an extension of the planar guide portion 72e and which is at the left end of the second lever member 72. As is evident from FIG. 20, the tapered portion 72f is inclined both in the left direction (indicated by the arrow X) and in the upward direction (indicated by the arrow Z). Because of this arrangement, as the second lever member 72 advances in the rightward direction (indicated by the arrow X), the pin 79c on the support 79 slides on the planar guide portion 72e and, at the same time, the depressing member 80 is held in its unclamped position while the pin 79c lowers along the tapered portion 72f so as to cause the depressing member 80 to move to the clamped position.

The shapes of the turntable 23 and the press member 80 will subsequently be described.

Figure 23:
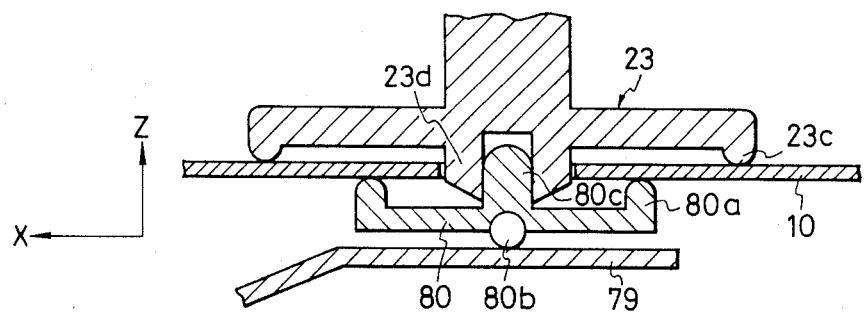

As shown in FIG. 23, an annular projection 23c extending over the whole circumference of the discoidal turntable 23 is formed on the outer periphery thereof and the turntable holds the disk 10 with the annular projection 23c. In addition, an annular projection 80a abutting against the principal face of the disk 10 is also formed on the outer periphery of a discoidal press member 80 as a principal member of the clamp mechanism for performing the disk clamp action in cooperation with the turntable 23. The diameter of the annular projection 80a of the press member 80 is smaller than that of the annular projection of the turntable 23. As described above, the press member 80 is rotatably supported by the support 70 through a ball bearing 80b, the support being movable relative to the turntable 23. A cylindrical guide 23d for fitting into the center hole of the disk 10 and positioning the disk relative to the turntable 23 is projected at the center of rotation of the turntable 23. Moreover, a projection 80c for mating with the guide 23d and providing the centering of the press member 80 relative to the turntable 23 is formed at the center of rotation of the press member 80.

The clamp mechanism, the second lever member 72 and the driving mechanism for driving the second lever member constitute the disk shift means for shifting the disk 10 located on the tray 11 and 12 ejected by the above tray-ejecting means out of the magazine body 8 in the direction perpendicular to the disk-holding face 23a (see FIG. 11(b)) of the turntable 23, i.e., upward (in the direction of the arrow Z). The disk shift means and the tray-ejecting means constitute the disk-unloading/conveying mechanism for successively selecting any one of the disks 10 in the magazine and conveying the disk into the disk-holding face 23a of the turntable 23. The second lever member 72 and the above driving mechanism for driving the second lever member are simultaneously used as the tray-ejecting means and the disk shift means, respectively.

As shown in FIGS. 6, 9 and 10, a tabular disk holding member 83 is disposed such that it is sandwiched between the movable chassis A 19 and the movable chassis B 20 which are the two components of the moving member 18. This holding member 83 is mounted on the movable chassis A 19 by means of a plurality of pins 83a that are in movable engagement with a cam groove 19e formed in that movable chassis A. As is also shown in FIG. 11(b), the cam groove 19e is typically formed such that it is inclined both in the leftward direction (indicated by the arrow X) and in the upward direction (indicated by the arrow Z). In other words, the cam groove 19e is formed such that when the disk holding member 83 moves leftward (or rightward), it simultaneously move upward (or downward). As is clear from FIGS. 9 and 10, the underside of the right rear end of the disk holding member 83 is provided with a projection 83b that extends downwardly, and if the right edge of this projection 83b is pushed by one end 70e (see FIG. 10) of the pivoting intermediate lever 70, the disk holding member 83 is caused to move leftward (in the direction indicated by the arrow X). It is to be noted that the disk holding member 83 is biased in the rightward direction (opposite to the direction indicated by the arrow X) typically by means the coil spring 84 shown in FIG. 9.

As already mentioned, the disk is moved by the disk moving means in the vertical direction perpendicular to the disk-carrying surface 23a (see FIG. 11(b)) of the turntable 23, and the function of the disk holding member 83 is to keep that disk parallel to said disk-carrying surface by means of the underside of said holding member which contacts the side of the disk facing said disk-carrying surface.

Turning back to FIGS. 6 and 8, a pair of sensor switches 86 and 87, the latter being positioned behind the former, are mounted on the inner surface (the left surface) of the right-hand erect portion 16c which is one component of the chassis 16. These switches will detect the position to which the moving body 56 has been driven by the motor 62. As is evident from FIG. 8, the sensor switches 86 and 87 are provided with actuators 86a and 87a, respectively, which project obliquely with respect to the switch bodies and are capable of swinging. A pair of rollers 88 and 89 which are movable only in the vertical direction with respect to the support body 32 fixed to the chassis 16 (i.e., in the direction indicated by the arrow Z and in the opposite direction) are engagement with these actuators 86a and 87a at their free end. As shown in FIGS. 19(a) and 19(b), each of the rollers 88 and 89 is in engagement with a projection 56f that has a trapezoidal cross section and which is formed on the underside of the front end of the moving body 56 in such a manner that it extends in forward and backward directions. If the moving body 56 moves a predetermined distance in either a forward or backward direction, each of the rollers 88 and 89 is caused to move either upwardly or downwardly depending on the case by means of the action of the projection 56f, whereupon the corresponding sensor switch 86 or 87 is actuated. It should be mentioned that the rollers 88 and 89 are caused to move upwardly by the biasing force exerted on the respective actuators 86a and 87a by the bias imparting means provided within the sensor switches 86 and 87.

Detection signals issued from the sensor switches, 34, 35, 49, 86 and 87, and from the photosensor 51 are transmitted to the control unit (already described but not shown), and in response to the operation signals that are sent from the control unit in response to said detection signals, the motors 27, 45 and 62, and the turntable 23 are operated at the predetermined timings which will be described hereinafter.

Figure 24:
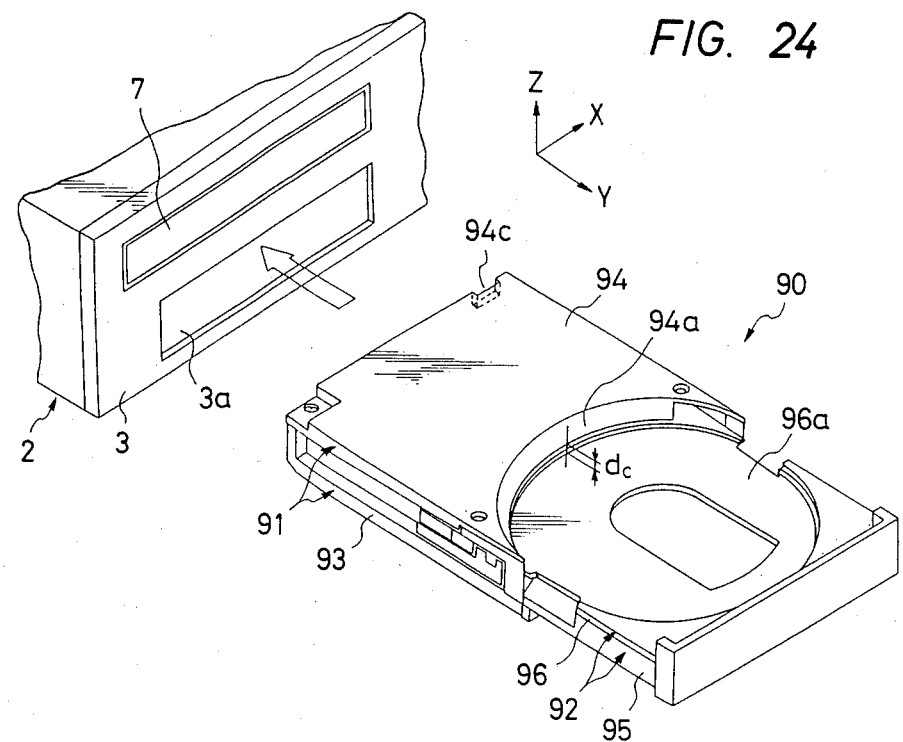
FIGS. 24 through 28 are diagrams showing a single adaptor.
Figure 26:
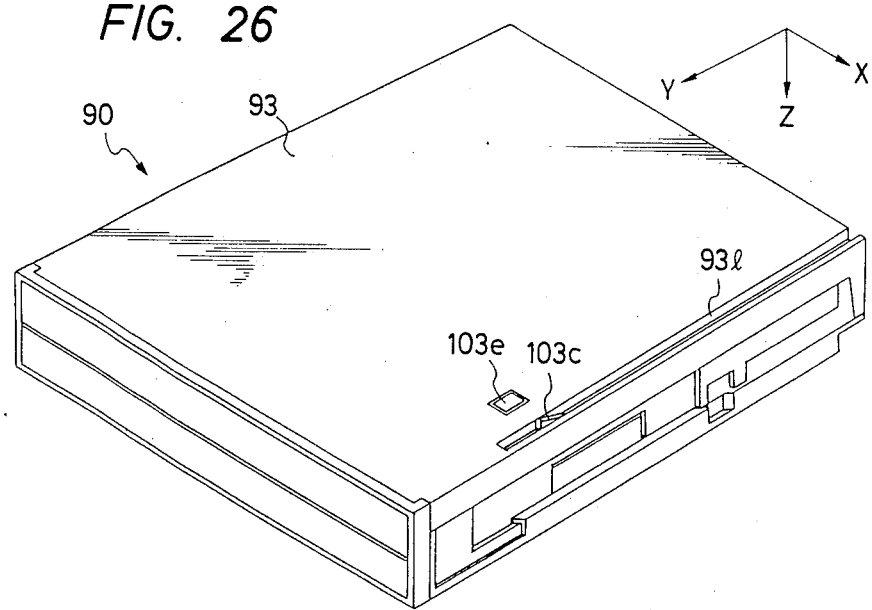
Figure 25:
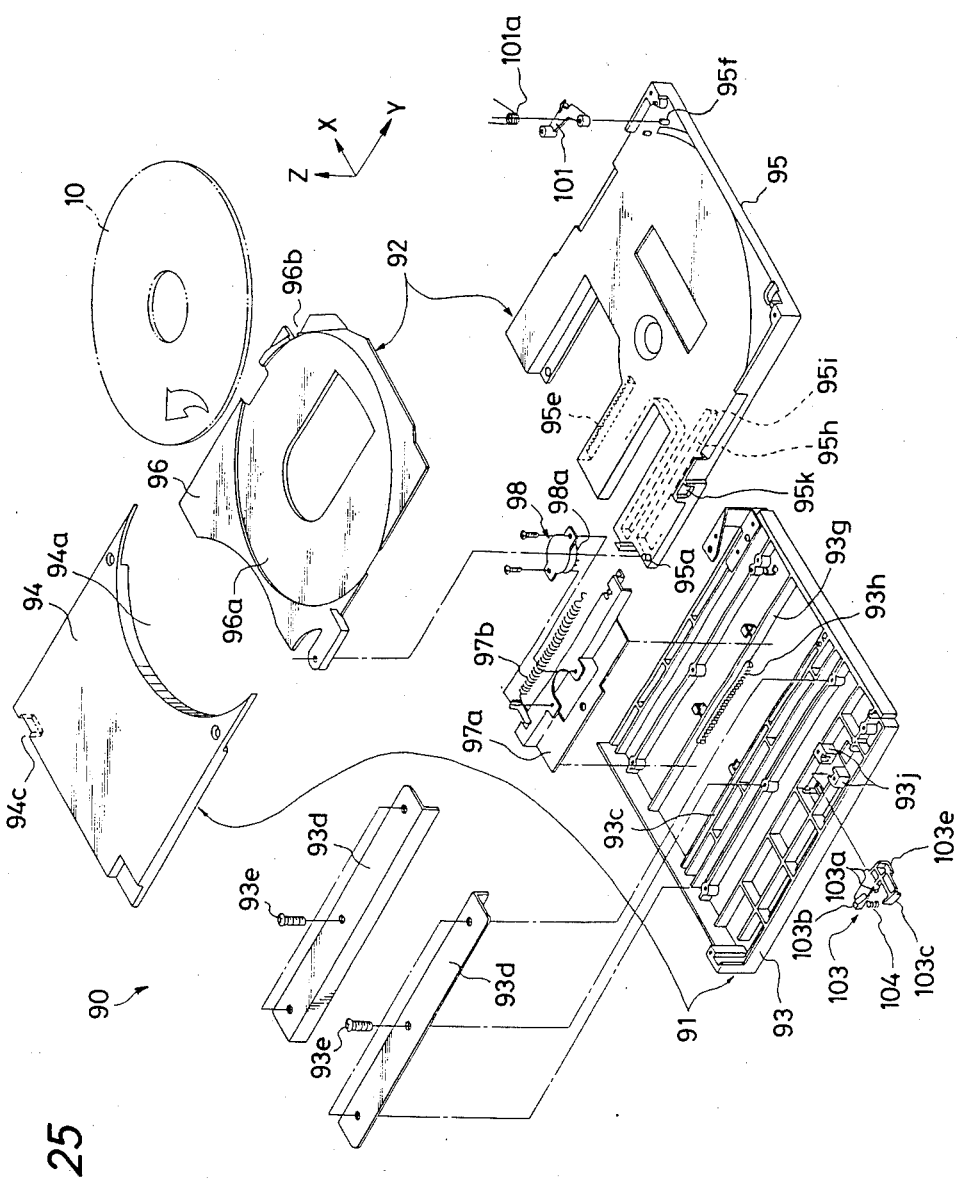
Figure 27:
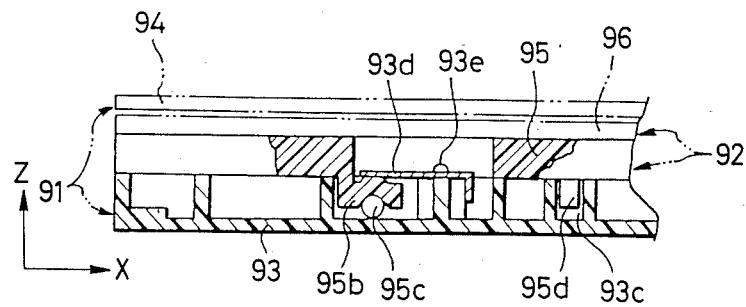

FIGS. 24 to 26 illustrate a single adapter 90 which functions as a disk holder for holding a single disk. the adapter 90 is detachably loaded into the magazine loading area in the multi-disk player 1 and which is capable of accommodating a single disk 10 in a replaceable manner.

As shown in FIG. 25, a single adaptor 90 is equipped with a first member 91 for being directly installed in the magazine-loading means and a second member 92 allowed to freely slide within a fixed range along the direction in which the first member is installed in the magazine-loading means and used to hold the disk. The first member 91 is a combination of a rectangular bottom plate 93 and a top plate 94 so positioned as to sandwich the second member 92 with the bottom plate and is provided with a semicircular cut 94a at its front end, the radius of curvature of the cut being slightly larger than the radius of the disk 10. Moreover, the second member 92 consists of a slide plate 95 slidably attached to (the bottom plate 93 of) the first member 91 and a tray C96 rotatable on a pin 95a projected from the rear right end of the slide plate 95 and used to hold the disk 10. A circular disk-holding face 96a whose diameter is slightly larger than that of the disk 10 is formed on the tray C96 as the member forming the second member 92. As shown in FIG. 24, the arcuate portions of the circular disk-holding face 96a and the semicircular cut 94a coincide with each other when the second member 92 moves relative to the first member 91 to position so as to eject from the loading means in the player housing 2. The dimension shown by dc of FIG. 24, i.e., the gap between the circular disk-holding face 96a and the top plate 94 is so arranged as to be greater than the thickness of the disk 10 and smaller than twice the thickness thereof. With this arrangement, the double insertion of the disk into the single adaptor can be prevented.

As shown in FIG. 17, a plurality of steel balls 95c attached to an overhang 95b formed on the slide plate 95 forming the second member 92 smoothly abut against the surface of the bottom plate 93 forming the first member 91. In this case, a linear guide groove 93c extended in the longitudinal direction is formed in the center of the bottom plate 93 and the slide plate is guided as a pin 95d projected from the under surface of the slide plate 95 slides in the guide groove.

A leaf spring 93d made of steel sheets is arranged in such a position as to sandwich the overhang 95b with the steel balls 95c and fixed to the body of the bottom plate 93 with a bolt 93e. The leaf spring 93d forms part of the bottom plate 93. The bottom plate 93 excluding the leaf spring 93d is made of plastics and the slide plate 95 excluding the steel balls 95c is also made of plastics. In other words, one side of the first and second members 91, 92 sliding on each other is made of plastics, whereas the other is metal.

As shown in FIG. 25, a rail 93g extended in parallel to the linear guide groove 93c is formed on the bottom plate 93 and a slider 97a formed of a steel sheet is movably installed on the rail 93g. A coil spring 97b is stretched between the rear end of the slide 97a and the front end of the bottom plate 93. The coil spring 97b provides the second member 92 including the slide plate 95 with forward biasing force. A damper 98 equipped with a control gear 98a is fixed to a slider 97a with bolts and a rack 95e extended in the longitudinal direction and formed on the slide plate 95 engages with the control gear 98a. The control gear 98a also engages with a rack 93h extended in the longitudinal direction and formed on the bottom plate 93. The damper 98 provides control force by making use of the viscosity resistance of a viscous agent such as grease held therein.

As shown in FIG. 25, a press lever 101 extended roughly in the longitudinal direction (in the directions of the arrow Y and opposite thereto) is installed at the front left end of the slide plate 95 and is attached to the slide plate 95 through a pin 95f so as to freely rotate. The pin 95f is however extended in the vertical direction (in the direction of the arrow Z and opposite thereto). The rear end of the press lever 101 can smoothly mate with a cut out 96b formed at the free end of the tray C 96. A spring member 101a for providing the press lever with pressing force mates with the press lever 101. the press lever 101 and the spring member 101a consitute the holding mechanism for holding the tray C 96 in the containment position of the slide plate 95.

As shown in FIG. 25, a lock member 103 is arranged at the right end of the bottom plate 93 and attached thereto so as to freely rotate by the smooth mating of a pair of pins 103a formed roughly in the center of the lock member in such a manner as to project in the transverse direction (in the directions of the arrow X and opposite thereto) with bearings 93j on the bottom plate 93. One end of the oscillating lock member 103 can mate with the under surface and the front end 95i of a linear guide 95h extended in the longitudinal direction and formed on the under surface of the slide plate 95. The lock member 103 is biased by a coil spring 104 in such a manner as to move close to the linear guide.

The lock member 103 and the coil spring 104 constitute the lock means for locking the second member 92 including the slide plate 95 to the first member 91 including the bottom plate 93. In otherwords, the forward movement of the second member relative to the first member is regulated as the rear end 103b of the lock member 103 biased by the coil spring 104 mates with the front end 95i of the linear guide 95.

A lever member 103c for releasing the locked state is incorporated in the other end, i.e., front end of the oscillating lock member 103. As shown in FIG. 26, the lever member 103c is projected from the single adaptor 90 and, when the single adaptor is installed in the loading means in the player housing, the lever member 103c is so arranged as to mate with the front end of the guide rail 2a (FIG. 1) installed in the loading means. When the lever member 103c mates with the front end of the guide rail 2a, the rear end 103b of the lock member 103 is so rotated as to depart from the front end 95i of the guide 95h of the slide plate 95, whereby the locked state induced by the lock means is released.

As shown in FIG. 26, a linear guide groove 93l for guiding the single adaptor 90 by mating with the guide rail 2a is formed on the underside of the bottom plate 93 and the lever member 103c is positioned in the guide groove 93l. In other words, the lever member 103c is set back from the surface of the bottom plate 93 as the housing of the single adaptor 90. The lever member 103c thus arranged is prevented from mating with the surface of, e.g., a table on which the single adaptor is inadvertently put by the listener and the locked state of the second member 92 relative to the first member by means of the lock means is maintained.

As shown in FIG. 25, a manual release bottom 103e for manually releasing the locked state of the second member 92 relative to the first member 91 by means of the lock means is incorporated in the front end of the lock member 103. As shown in FIG. 26, the manual release button 103e of the single adaptor is exposed through an opening formed in the bottom plate 93 so that it can be pressed by the finger. Moreover, the surface of the manual release button 103e is set at the same level as that of the bottom plate or otherwise recessed. Even if the listener inadvertently places the single adaptor on a table or the like, the manual release button 103e is prevented from being pressed by the surface of the table and the locked state of the second member 92 provided by the lock means relative to the first member 91 is maintained.

As shown in FIGS. 24, 25, a recess 94c for receiving the overhang 64b protruded from one end of the oscillating lever 64 shown in FIG. 13 is provided at the left rear end of a top plate 94 as a member forming part of the single adaptor 90. When the single adaptor 90 is inserted and installed properly (as shown in FIG. 24) in the loading means of the player housing 2, the overhang 64b of the oscillating lever 64 is smoothly pressed by the single adaptor to cover the whole oscillating stroke. When the single adaptor 90 is improperly installed in the vertically inverted state, however, the overhang 64b of the oscillating lever 64 is fitted into the recess 94c and the oscillation of the oscillating lever 64 prevents the insertion of the single adaptor into the loading means. The installation of the single adaptor is thus checked.

As shown in FIG. 25, a recess 95k for receiving one end of the revolving lock member 67 shown in FIG.

19(a) is formed in the right-hand face of the slide plate 95 forming part of the single adaptor 90.

Figure 28:
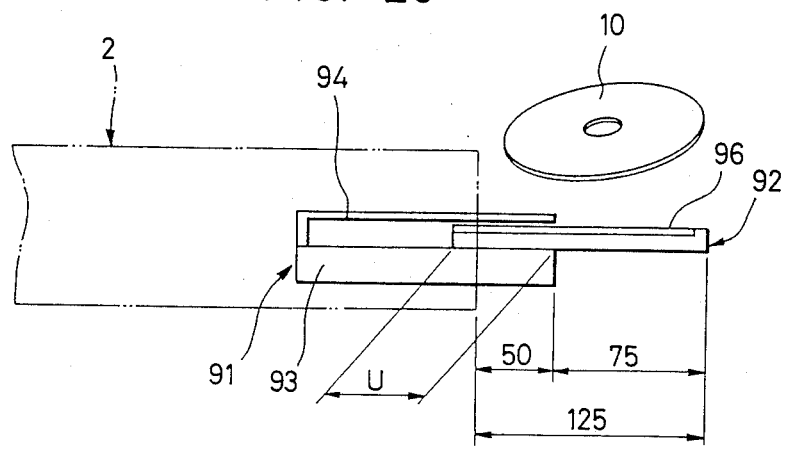

As shown in FIG. 28, the first member 91 is also ejected out of the magazine-loading means in the player housing 2 when the second member 92 is moved relative to the first member 91 to load the disk 10 on (the tray C 96 forming part of) the second member. However, the second member 92 is moved relative to the first member 91 by the coil spring 97b, whereas the first member 91 is ejected from the loading means by e.g., the oscillating lever 64 and the coil spring 64d shown in FIG. 10. The first and second members 91, 92 are locked by the lock member 67 shown in FIG. 19(a) in the loading means.

As shown in FIG. 28, it has been so arranged that the sum (125 mm) of the quantity (e.g. 50 mm) of the ejection of the first member 91 from the loading means and that (e.g., 75 mm) of the movement of the second member 92 relative to the first member 91 is slightly larger than the diameter (120 mm) of the disk 10. Accordingly, the U dimension shown in FIG. 28, i.e., the overlapped dimension of the first and second members 91, 92 is set relatively large when the second member is ejected from the loading means to attach and detach the disk 10 to and from (the tray C 96 of) the second member 92.

The position of one disk 10 contained in the single adaptor 90 is made to correspond to that of the central one of the six disks contained in the magazine 5 (see FIGS. 1 through 5). In consequence, the disk-loading state relative to the single adaptor is stabilized, which offers excellent external appearance while the first and second members 91, 92 are ejected from the magazine-loading means.

In that case, the loading of the single adaptor 90 onto the player body is also detected by the switches 34, 35 shown in FIG. 16, i.e., the switches for use in detecting whether the magazine 5 is loaded onto the player body. More specifically, a recess is formed in the portion of the single adaptor 90 which should abut against the overhang 33g (against which the rear end of the magazine 5 abuts) formed on the moving lever 33 for operating the switches 34, 35. With the above arrangement, the quantity of the movement of the moving lever 33 varies depending on the case where the single adaptor 90 or magazine 5 is loaded and this causes the on/off state of the switch 34 or 35 to change. Accordingly, it becomes possible to determine whether the single adaptor 90 the magazine 5 has been loaded.

Figure 30:
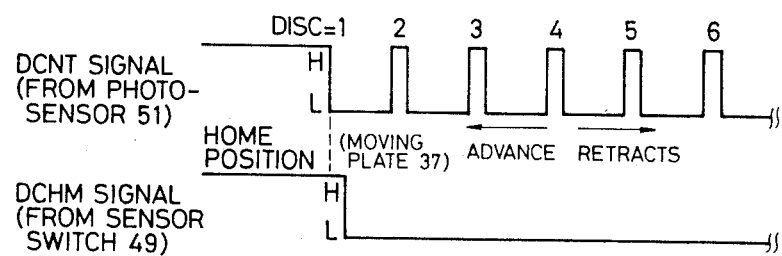
FIGS. 29, 30 are diagrams illustrating the operation of the multidisk player.
Figure 29:
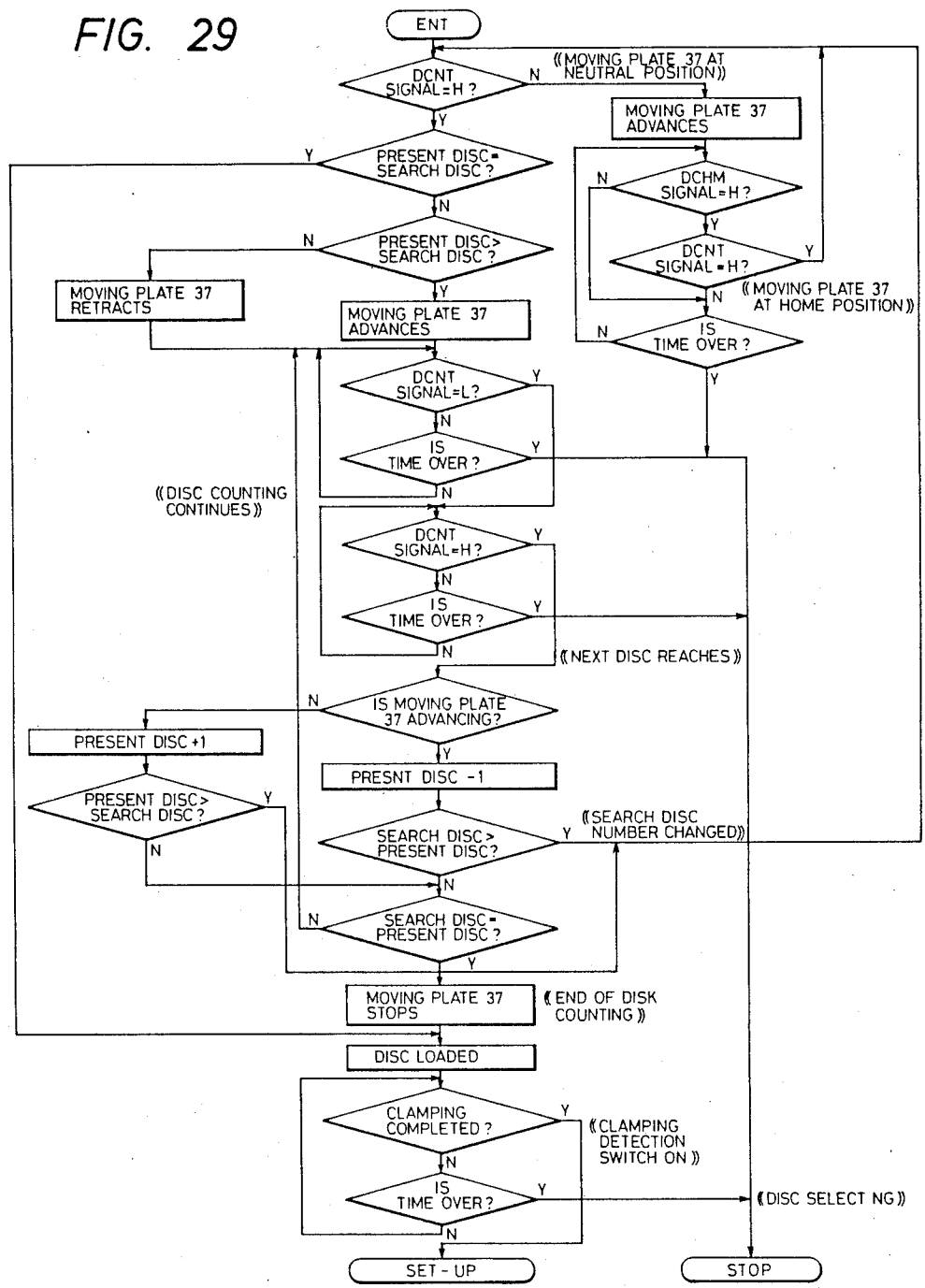

The operation of the multi-disk player having the construction described above is hereunder described briefly in accordance with the sequence of playing steps with reference to FIGS. 1 to 28 taken in conjunction with FIGS. 29 and 30.

When the disk to be played is selected by pushing one or more of the buttons shown in FIG. 1, a drive voltage is applied to the motor 45 and the moving plates 37 and 38 start to move either forwardly (in the direction indicated by the arrow Y) or backwardly (in the direction opposite to that indicated by the arrow Y). Then as a result of the action of the cam grooves 37d and 38d formed in the shape of a staircase in the moving plates 37 and 38 as combined with the action of the guide grooves 16e formed in the chassis 16, the pins 20c movably fitted in the respective grooves are caused to move upwardly or downwardly, whereupon the moving member 18, including the movable chassis B 20 on which the pins 20c are studded, is allowed to move either upwardly or downwardly. As a consequence, the tray projecting member 53 provided on the movable member 18 reaches the position where it engages with the tray 11 or 12 carrying the disk to be played.

Detailed mechanisms for the forward and backward movements of the moving plate 37 and its positioning and, hence, the upward and downward movements of the tray projecting member 53 and its positioning, are described hereinafter.

The "DCNT" signals shown in FIGS. 29 and 30 refer to the slit detection signals issued from the photosensor 51, and the "DCHM" signals refer to the detection signals issued from the sensor switch 49 for checking to see if the moving plate 37 is at its most retracted position (the position for the limit of the forward movement), or in the home position. As shown in FIG. 29, if a command signal is on while the photosensor 51 is issuing a DCNT signal, the moving plate 37 is moved by the distance corresponding to the difference between the present address (present DISC) and the desired address (search DISC). If, on the other hand, a command signal is on while no DCNT signal is being issued from the photosensor 51, the moving plate 37 continues to be retracted (moved forwardly) until a DCHM signal is issued from the sensor switch 49, and thereafter the plate is moved to the position of the desired address (search DISC).

When the tray projecting member 53 is brought to the position where, by the procedures described above, it engages with the tray carrying the disk to be played, the motor then starts to rotate to drive the moving body 56 in the backward direction (opposite to the direction indicated by the arrow Y). As a result, the intermediate lever 70 is caused to pivot in the counterclockwise direction with reference to FIG. 10 and the second lever member 72 connected to said intermediate lever is caused to move rightward (in the direction opposite to the direction indicated by the arrow X). As shown in FIG. 20, the second lever member 72 is locked to the first lever member 71 by means of the lock/unlock mechanism including the movable slider 76. Consequently, both the first lever member 71 and the second lever member 72 are caused to move rightward, causing the tray projecting member 53 to pivot in the clockwise direction with reference to FIG. 10. Therefore, as shown in FIG. 2(b), the tray (e.g., tray B 12) carrying the disk to be played is caused to project from the magazine body 8 and the disk is caused to move to a position which is concentric with, namely, right under, the disk-carrying surface 23a of the turntable 23 (FIG. 11(b)). It should be noted that immediately before the pivoting of the tray projecting member 53 and, hence, the rightward movement of the first lever member 71, is completed, the first lever member 71 is unlocked from the second lever member 72, and subsequent slight movement of the first lever member 71 in the rightward direction is effected by the urging force of the coil spring 75 (FIG. 20) and the arched portion 12m of the tray B 12 (see FIG. 2(b)) that is being pressed by the urging force is brought into contact with the predetermined arched contact portion 19c of the movable chassis A 19. These procedures will complete the positioning of the tray B 12. the fact that the tray has been projected from the magazine body 8 is detected by sensing a detection signal issuing from the sensor switch 87 (see FIG. 8 and other drawings) that is actuated by the movement of the moving body 56.

The second lever member 72 that has been unlocked from the first lever member 71 is further driven in the rightward direction (opposite to the direction indicated by the arrow X), and the support 79 (FIG. 10) that is engaged with the tapered portion 72f (FIG. 20) of the second lever member by means of the pin 79c is caused to swing upwardly (in the direction indicated by the arrow Z). As a result, the disk is lifted and clamped to the turntable 23. This upward movement of the disk is shown by "DISC load" in FIG. 29. Simultaneously with this upward movement of the disk, the intermediate lever 70 pivots to lift the disk holding member 83 together with the disk. It should be mentioned that at the time when the loading of the disk on to the turntable has been completed, the disk holding member 83 is slightly disengaged from the disk and will not prevent continued revolution of the disk.

The above procedures render the system ready for play and the turntable 23 and the carriage 24 (see FIG. 9 and other drawings) are operated to start the playing of the desired disk.

When the playing of the desired disk ends, the disk is rotated into the magazine body 8. This may be done by reversing the above-described disk loading sequence and, therefore, it will not be necessary to describe the re-loading sequence in detail. The procedures described in the preceding paragraphs may be repeated as many times as the number of the pieces of music the listener wants to play.

The magazine 5 is ejected from the player by depressing the "EJECT" button in the group of control buttons 6. When the "EJECT" button is depressed, the moving body 56 (see, for example, FIG. 19) is caused to move forward (in the direction indicated by the arrow Y) by a predetermined distance, whereupon the magazine 5 is released from the state of being locked by the locking member 67. Thereafter, the moving body 56 is caused to move further in the forward direction, whereby the swinging lever 64 shown in FIG. 10 is caused to swing about the pin 64a and the magazine 5 engaging with the free end of the lever is pushed out of the player.

The single adaptor 90 may be used in the same way as the magazine 5 after it is inserted into the housing 2 through the opening 3a. When the single adaptor 90 is loaded, the above described locking mechanism that will lock the second member 92 to the first member 91 is released. If the single adaptor is pushed further toward the retracted position against the urging force exerted by the coil spring 97, the locking member 67 will come into engagement with the recess 95K formed on the slide plate 95 which is one of the components of the second member 91.

When a play mode is commanded, the tray C 96 is pivoted as in the case of the magazine 5, thereby allowing the disk to be played. If the listener wants to replace the disk, the "EJECT" button which is the same as what is selected when using the magazine is depressed. This causes the tray C 96 to pivot in the opposite direction as in the case of the magazine 5 and, subsequently, the locking member 67 is disengaged from the recess 95K.

The first and second members 91, 92 are, as shown in FIG. 28, ejected to the extent that the tray C 96 is completely exposed to view. In order to replace the disk then, the listener is required only to replace the disk on the tray with a desired one and force the second member 92 in together with the first member 91 but not to again detach the single adaptor 90. If the ejected first and second members 91, 92 are further pulled out, the single adaptor 90 can be removed and replaced with the magazine 5.

As set forth above in detail, the disk holder (magazine 5) is equipped with the housing (magazine body 8) and a plurality of plate-shaped trays (11, 12), each capable of loading the disk on the principal face thereof and of being ejected from and retracted in the housing along the principal face, and flexible members (11f, 12f) projected from said principal face in a fixed position on the principal face of the adjoining tray arranged opposite to the disk holding face of each tray.

When the plate-like tray loaded with any one of the disks for playback is ejected from the housing (magazine body 8), accordingly, the flexible members are caused to touch the surface of a disk loaded on the adjoining tray, thus preventing the disk from being damaged.

Since the disk holder (single adaptor 90) detachable from and attachable to the predetermined loading means in the multidisk player holds a replaceable disk as set forth above, any one of the desired disks can instantly be loaded onto the multidisk player and the disk is also readily replaceable. Accordingly, its operability is by far improved.

The disk holder (the single adaptor 90) comprises the first member 91 for being directly loaded to the loading means, the second member 92 movable relative to the first member within a fixed range along the direction wherein the first member is loaded to the loading means, the second member being loaded with one disk, the means (the coil spring 97b) for providing the second member with moving force and the lock means (the lock member 103 and the coil spring 104) for locking the second member to the first member, and the lock means includes the lever member 103c for releasing the locked state and, when loaded to the loading means, the lever member mates with the predetermined mating means 2a provided in the loading means to release the locked state caused by the lock means.

The reason for the provision of the lock means is that the listener is not invited to handle the disk holder only while the second member is kept movable relative to the first member. The locked state attributed to the lock means is then released when the disk holder is loaded to the loading means and the second member must be made movable relative to the first member fixed to the loading means to make the second member ejectable from and containable in the loading means. It is however troublesome for the listener to release the locked state manually each time the disk holder is loaded. In the disk holder according to the present invention, the locked state is, as aforementioned, automatically released simultaneously with the insertion of the disk holder into the loading means, so that the operability related to disk replacement is further improved.

In the disk holder according to the present invention, the lever member is set back from the surface of the housing of the disk holder. Even if the listener inadvertently places the disk holder on, e.g., a table, the lever member is prevented from mating with the surface thereof and the locked state of the second member caused by the lock means relative to the first member is maintained.

In the disk holder according to the present invention, moreover, the manual release button 103e for manually releasing the locked state caused by the lock means is provided for the listener.

There may arise a case where the listener desires to handle only the disk holder separately from the player body in order to move the second member relative to the first member. In that case, it is not always easy for the listener to operate the lever member retreated from the surface of the housing of the disk holder. The installation of such a manual release button makes such operation extremely easy.

Further, the first member comprises the bottom plate 93 and the top plate 94 so positioned as to sandwich the second member 92 with the bottom plate and coupled to the bottom plate. The second member is provided with the circular disk-holding face 96a whose diameter is slightly larger than that of the disk. The top plate is supplied with the semicircular cut out (94a) whose radius of curvature is slightly larger than the radius of the disk, the semicircular cut out being provided at one end opposite to the direction wherein the second member is loaded to the loading means. The arcuate portions of the circular disk-holding face and the semicircular cutting conform to each other while the second member to be ejected from the loading means moves relative to the first member.

Since the disk holder is thus constructed, the circular disk-holding face and the semicircular cut out having arcuate portions conforming to each other form a so-called disk guide when a disk is loaded on the circular disk-holding face, so that the disk is accurately mounted on the circular disk-holding face. Accordingly, operability related to disk replacement is further improvable.

Since the arcuate portions of the circular disk-holding face and the seimcircular cut out conform to each other, the disk-loading means looks fine and stable in view of external appearance.

As set forth above, the multidisk player according to the present invention including a player housing (2), playback means provided in the player housing, a disk holder (magazine 5) for holding disks and for being inserted and loaded to the player housing and a disk-unloading/conveying mechanism for conveying the disk contained in the disk holder to a playback position; the disk holder (magazine 5) having a housing (magazine body 8) and a plurality of plate-shaped trays 11, 12, each being capable of holding a disk 10 on the principal face thereof and of being ejected from and contained in the housing along the principal face; the disk-unloading-/conveying mechanism having a support member (chassis 16) extending along the direction wherein the trays are arranged, a moving member 18 installed on the support member movably in the direction of said arrangement of trays and loaded with said playback means, a tray-ejecting member 53 installed on the moving member rotatably on a rotary shaft extending in the direction of the arrangement thereof and employed to eject the tray from the housing by successively mating with the end of each rotating tray, shifting means for shifting the tray-ejecting member tray, ejecting member together with the moving member to the position where the tray loaded with the disk to be played back mates therewith, torque generator means (motor 62) for driving the tray-ejecting means to allow the tray to eject from the housing and torque transmission means (moving body 56, etc.), the torque generator means and the torque transmission means being provided on the support member (chassis 16).

In other words, by shifting the playback means as a whole including the turntable, together with the moving member loaded with the playback means, along the direction in which the trays are arranged, the tray and the turntables are relatively moved. Moreover, each tray is pushed by the rotation of the tray-ejecting member and ejected out of the housing of the disk holder, so that the disk on the tray is located right under the turntable. Since the torque generator means and the torque transmission means are fixed on the support member, however, it becomes possible to make compact the moving part consisting of the moving member, the playback means loaded on the moving member and the tray-ejecting member. The torque generator means on the moving member. However, the moving part will become larger to that extent.

The moving parts thus reduced in size makes it possible to employ a small output driving source for shifting the moving part along the direction in which the trays are arranged and also easily make compact the disk player as a whole. Moreover, the accurate shifting of the turntable and thus accurate disk conveyance can be implemented with the compact moving part.

If the torque generator means is mounted on the moving member, power supply wiring will become less simple because power must be supplied to the motor as the torque generator to be shifted with the moving members. In the multidisk player according to the present invention, wiring for power supply is extremely easy because the torque generator means including the motor is not shifted as described above.

As set forth above, the multidisk player according to the present invention comprises a lock mechanism for locking the disk holder (magazine 5) for holding disks and for being inserted and loaded to the loading means of a player housing to the player housing in the loading position and the tray-ejecting member 53 driving means for driving the tray-ejecting member for ejecting the tray loaded with the disk to be played back from the housing of the disk holder. The tray-ejecting member driving means is equipped with the moving body 56 installed movably in a fixed direction and used to drive the tray-ejecting member and the means for providing the moving body with driving force. The lock mechanism is provided with the lock member 67 installed in such a manner as to reciprocate between the first position where the disk holder is locked and the second position where the locked state is released and lock the disk holder by partially mating with the disk holder, and an energizing means for so energizing the lock member as to make the lock member mate with the disk holder. When the lock member is located close to the second position, the lock member mates with the moving body to regulate the movement of the moving body.

In other words, the lock member is not allowed to move to the first position when the disk holder (magazine 5) has not completely been loaded to the loading means of the player housing, whereby the moving body is so regulated as to prevent the disk loading operation. In case the lock member is not so arranged, the moving body will move to effect the disk-loading operation even if the listener does not load the disk holder to the loading means completely. The tray 11, 12 ejected by the tray-ejecting member 53 from the housing (magazine body 8) of the disk holder (magazine 5), for instance, may be caught by the chassis and the like in the player housing. In the multidisk player according to the present invention, such inconvenience can not occur and disk-loading is always ensured; that is, operability concerning disk-loading has been improved.

What is claimed is:

1. A disk holder adapted to be inserted and fitted into a loading means of a disk player, and to supply a disk to said disk player in response to an operation thereof so as to perform playback of said disk, said disk holder comprising:
   a housing for holding a plurality of disks;
   a plurality of plate shape trays each loading a respective one of said disks on a disk loading face thereof, each of said trays being provided ejectable from and retractable in said housing in directions parallel to said disk loading face; and
   flexible members projecting from a principal face of a first one of said trays opposite said disk loading face thereof and confronting said disk loading face of a neighboring one of said trays.

2. A disk holder as claimed in claim 1, wherein each of said trays is formed with a recess along a locus representing a movement of said flexible member installed on said neighboring one of said trays during said ejecting and retracting.

3. A disk holder for holding disks in a housing, for being inserted and fitted into loading means of a disk player and supplying a proper disk to said disk player in concert with an actuation of said disk player so as to allow the playback of said proper disk, said disk holder comprising:
   a first member for being directly loaded into said loading means and ejectable therefrom;
   a second member supported by and movable relative to said first member within a fixed range along a direction along which said first member is loaded in said loading means, said second member being loadable with a single disk;
   means for providing moving force to said second member; and
   lock means for locking said second member to said first member in a locked state, said lock means including a lever member for releasing said locked state, said lever member being engageable with a fixed structure provided in said loading means to thereby release said locked state caused by said lock means when said first member is located in said loading means.

4. A disk holder as claimed in claim 3, wherein said lever member is disposed away from exterior surfaces of said housing.

5. A disk holder as claimed in claim 3, wherein said lever member is disposed away from surfaces of said housing, and further comprising a manual release button for releasing the locked state caused by said lock means.

6. A disk holder as claimed in claim 5, wherein a surface of said manual release button is flush with a surface of said housing.

7. A disk holder as claimed in claim 5, wherein a surface of said manual release button is positioned inwardly with respect to a surface of said housing.

8. A disk holder for holding disks in a housing, for being inserted and fitted into loading means of a disk player and supplying a proper disk to said disk player in concert with the actuation of said disk player so as to allow the playback of said proper disk, said disk holder comprising:
   a first member for being directly loaded in said loading means;
   a second member supported by and movable relative to said first member within a fixed range along a direction, along which said first member is loaded to said loading means, said second member being loadable with a single disk; and
   means for providing said second member with moving force;
   said first member comprising a bottom plate and a top plate so positioned as to sandwich said second member therebetween, said top plate being coupled to said bottom plate; and
   said second member being provided with a circular disk-holding face whose diameter is slightly larger than that of the disks, said top plate being supplied with a semicircular cut out whose radius of curvature is slightly larger than an outer radius of the disks, said semicircular cut out being provided at one end facing a direction from which said first member is loaded into said loading means, and arcuate portions of said circular disk-holding face and said semicircular cut out conforming to each other when said second member is ejected from said loading means and said first member remains at least partially within said loading means.

9. A disk holder as claimed in claim 8, wherein a gap between said circular disk-holding face and said top plate is larger than a thickness of one of the disks and smaller than twice said thickness.

10. A multidisk player, comprising:
    a player housing;
    playback means provided in said player housing and including pickup means;
    a disk holder for holding a plurality of disks and for being inserted and loaded to said player housing; and
    a disk-unloading/conveying mechanism for conveying a selected one of said disks held by said disk holder to a playback position adjacent said playback means;
    said disk holder having a housing and a plurality of plate-shaped trays, each being capable of holding a disk on a principal face of said each tray and capable of being ejected from and contained in said housing in a direction parallel to the principal face;
    said disk-unloading/conveying mechanism having a support member extending along an arrangement direction along which said trays are arranged, a moving member installed on said support member movable in said arrangement direction and loaded with said playback means, a tray-ejecting member installed on said moving member rotatably on a rotary shaft extending in the arrangement direction and employed to eject said tray from said housing by successively mating with an end of each tray, shifting means for shifting said tray-ejecting member together with said moving member to a position where the tray loaded with the selected disk mates therewith, torque generator means for driving said tray-ejecting means to allow the tray to eject from said housing and torque transmission means, said torque generator means and said torque transmission means being provided on said support member.

11. A multidisk player, comprising:
    a player housing;
    playback means provided in said player housing;
    a disk holder for holding a plurality of disks and for being inserted and loaded into loading means in said player housing at a loaded position;
    a lock mechanism for locking said disk holder to said player housing at said loaded position; and a disk-conveying mechanism for conveying a selected one of said disks held by said disk holder to a playback position;

said lock mechanism being equipped with a lock member for locking said disk holder to said player housing;

said lock mechanism mating with said disk-conveying mechanism to regulate the movement of said disk-conveying mechanism when said lock member is not positioned to lock said disk holder to said player housing.

* * * * *